(12) United States Patent
Katsurahira

(10) Patent No.: US 9,600,117 B2
(45) Date of Patent: Mar. 21, 2017

(54) POSITION DETECTOR AND POSITION INDICATOR

(71) Applicant: Wacom Co., Ltd., Saitama (JP)

(72) Inventor: Yuji Katsurahira, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/056,443

(22) Filed: Feb. 29, 2016

(65) Prior Publication Data

US 2016/0179280 A1   Jun. 23, 2016

Related U.S. Application Data

(63) Continuation of application No. 14/612,888, filed on Feb. 3, 2015, now Pat. No. 9,459,726, which is a
(Continued)

(30) Foreign Application Priority Data

Oct. 19, 2009   (JP) .................................. 2009-240727

(51) Int. Cl.
*G09G 5/00* (2006.01)
*G06F 3/041* (2006.01)
(Continued)

(52) U.S. Cl.
CPC .......... *G06F 3/0416* (2013.01); *G06F 3/0383* (2013.01); *G06F 3/03545* (2013.01);
(Continued)

(58) Field of Classification Search
CPC ....... G06F 3/03545; G06F 2203/04102; G06F 3/0383; G06F 3/041; G06F 3/0412;
(Continued)

(56) References Cited

U.S. PATENT DOCUMENTS 4,430,526 A * 2/1984 Brown ................ G06F 3/03542
178/19.05
4,672,154 A * 6/1987 Rodgers .............. G06F 3/03545
178/19.07
(Continued)

FOREIGN PATENT DOCUMENTS

CN       1246681 A      3/2000
EP       0967566 A2    12/1999
(Continued)

OTHER PUBLICATIONS

Chinese Office Action dated Jun. 27, 2014, for corresponding CN Application No. 201010515745.3, 7 pages.
(Continued)

*Primary Examiner* — Temesghen Ghebretinsae
*Assistant Examiner* — Michael J Jansen, II
(74) *Attorney, Agent, or Firm* — Seed IP Law Group LLP

(57) ABSTRACT

A position indicator is provided, which includes a pressure sensor configured to detect a pressure applied to a tip of the position indicator. The position indicator further includes a storage configured to store the pressure as one type of digital data and to store at least one other type of digital data. The position indicator also includes a receiver configured to receive a command signal transmitted from a position sensor, and a control circuit configured to select one or more types of digital data in the storage based on the command signal. The position indicator includes a transmitter configured to transmit the selected one or more types of digital data to the position sensor.

21 Claims, 20 Drawing Sheets

Related U.S. Application Data continuation of application No. 12/888,941, filed on Sep. 23, 2010, now Pat. No. 8,982,044.

(51) Int. Cl.

| | | |
|---|---|---|
| *G06F 3/0354* | (2013.01) | |
| *G06F 3/046* | (2006.01) | |
| *G06F 3/038* | (2013.01) | |
| *G06F 3/044* | (2006.01) | |

(52) U.S. Cl.
CPC .............. *G06F 3/041* (2013.01); *G06F 3/044* (2013.01); *G06F 3/046* (2013.01); *G06F 3/0412* (2013.01); *G06F 3/0414* (2013.01); *G06F 2203/04102* (2013.01)

(58) Field of Classification Search
CPC ...... G06F 3/0414; G06F 3/0416; G06F 3/044; G06F 3/046
USPC ......................................................... 345/156
See application file for complete search history.

(56) References Cited

U.S. PATENT DOCUMENTS

| | | | | |
|---|---|---|---|---|
| 4,786,765 A * | 11/1988 | Yamanami | ............... | G06F 3/046 178/19.06 |
| 4,848,496 A * | 7/1989 | Murakami | ............... | G06F 3/046 178/18.07 |
| 4,988,837 A * | 1/1991 | Murakami | ............... | G06F 3/046 178/18.07 |
| 4,999,461 A * | 3/1991 | Murakami | ............... | G06F 3/046 178/18.07 |
| 5,028,745 A * | 7/1991 | Yamanami | ............... | G06F 3/046 178/18.07 |
| RE34,187 E * | 3/1993 | Yamanami | ............... | G06F 3/046 178/18.07 |
| 5,191,175 A * | 3/1993 | Protheroe | ............... | G06F 3/044 178/18.02 |
| 5,414,227 A * | 5/1995 | Schubert | ................. | G06F 3/046 178/19.01 |
| 5,420,379 A * | 5/1995 | Zank | ...................... | G06F 3/041 178/19.03 |
| 5,475,401 A * | 12/1995 | Verrier | .................... | G06F 3/0418 178/18.03 |
| 5,495,077 A * | 2/1996 | Miller | ..................... | G06F 1/1626 178/18.06 |
| 5,528,002 A * | 6/1996 | Katabami | ........... | G06F 3/03545 178/19.06 |
| 5,543,588 A * | 8/1996 | Bisset | .................... | G06F 1/1626 178/18.06 |
| 5,554,828 A * | 9/1996 | Primm | ..................... | G06F 3/044 178/18.07 |
| 5,567,920 A * | 10/1996 | Watanabe | ................ | G06F 3/046 178/18.07 |
| 5,571,997 A * | 11/1996 | Gray | ................... | G06F 3/03545 178/19.04 |
| 5,600,105 A * | 2/1997 | Fukuzaki | ............... | G06F 3/046 178/18.07 |
| 5,619,431 A * | 4/1997 | Oda | ........................ | G06F 3/046 702/150 |
| 5,631,666 A * | 5/1997 | Tagawa | ................. | G06F 3/0412 178/20.01 |
| 5,644,108 A * | 7/1997 | Katsurahira | ............ | G06F 3/046 178/18.07 |
| 5,646,377 A * | 7/1997 | Oda | ........................ | G06F 3/046 178/18.07 |
| 5,654,529 A * | 8/1997 | Yeung | ................. | G06F 3/03545 178/19.03 |
| 5,661,269 A * | 8/1997 | Fukuzaki | ............... | G06F 3/046 178/19.06 |
| 5,672,852 A * | 9/1997 | Fukuzaki | ............... | G06F 3/046 178/18.07 |
| 5,679,930 A * | 10/1997 | Katsurahira | ........... | G06F 3/041 178/19.06 |
| 5,682,019 A * | 10/1997 | Katsurahira | ........... | G06F 3/046 178/18.07 |
| 5,699,084 A * | 12/1997 | Fukuzaki | ................ | G06F 3/038 178/19.01 |
| 5,706,000 A * | 1/1998 | Fukuzaki | ............... | G06F 3/046 341/5 |
| 5,714,984 A * | 2/1998 | Fukuzaki | ............... | G06F 3/046 178/19.03 |
| 5,729,251 A * | 3/1998 | Nakashima | ......... | G06F 3/03545 345/156 |
| 5,736,980 A * | 4/1998 | Iguchi | .................. | G06F 3/0412 178/20.03 |
| 5,754,036 A * | 5/1998 | Walker | ................ | H02M 5/2573 323/235 |
| 5,774,571 A * | 6/1998 | Marshall | ............... | G06F 3/0346 382/119 |
| 5,844,548 A * | 12/1998 | Chen | ....................... | G06F 3/046 178/18.01 |
| 5,854,448 A * | 12/1998 | Nozaki | .................... | G06F 3/041 178/18.01 |
| 5,854,881 A * | 12/1998 | Yoshida | ................ | G06F 3/0412 178/18.07 |
| 5,877,752 A * | 3/1999 | Puthuff | ................. | G06F 3/0386 345/180 |
| 5,898,136 A * | 4/1999 | Katsurahira | ........... | G06F 3/046 178/18.01 |
| 5,902,968 A * | 5/1999 | Sato | .................... | G06F 3/03545 178/19.01 |
| 5,969,296 A * | 10/1999 | Yamamoto | .......... | G06F 3/03545 178/18.01 |
| 5,977,958 A * | 11/1999 | Baron | ................... | G06F 3/0433 178/19.01 |
| 5,977,959 A * | 11/1999 | Katsurahira | ........ | G06F 3/03545 178/19.01 |
| 6,005,200 A * | 12/1999 | Stanchak | ................ | G06F 3/044 178/18.01 |
| 6,005,555 A * | 12/1999 | Katsurahira | ............ | G06F 3/046 178/18.06 |
| 6,188,392 B1 * | 2/2001 | O'Connor | ........... | G06F 3/03545 178/18.01 |
| 6,249,234 B1 * | 6/2001 | Ely | ...................... | G01D 5/2073 178/18.06 |
| 6,259,438 B1 * | 7/2001 | Fleck | .................. | G06F 3/03545 178/19.01 |
| 6,417,846 B1 * | 7/2002 | Lee | ..................... | G06F 3/03545 178/18.01 |
| 6,489,899 B1 * | 12/2002 | Ely | ...................... | G01D 5/2073 178/18.06 |
| 6,556,190 B2 * | 4/2003 | Fleck | .................. | G06F 3/03545 178/19.01 |
| 6,577,299 B1 * | 6/2003 | Schiller | ................. | G06F 3/0325 345/158 |
| 6,633,280 B1 * | 10/2003 | Matsumoto | ........... | G06F 3/0433 178/18.02 |
| 6,634,560 B1 * | 10/2003 | Grabau | ............. | G06K 7/10336 235/472.01 |
| 6,639,585 B1 * | 10/2003 | Nagai | ..................... | G06F 3/046 345/173 |
| 6,667,740 B2 * | 12/2003 | Ely | ...................... | G01D 5/2073 178/19.03 |
| 6,744,426 B1 * | 6/2004 | Okamoto | .......... | G06F 3/03545 178/18.07 |
| 6,784,876 B1 * | 8/2004 | Nagai | ..................... | G06F 3/046 178/18.01 |
| 6,801,192 B2 * | 10/2004 | Fujitsuka | .............. | G01D 5/2006 178/18.01 |
| 6,909,426 B2 * | 6/2005 | Chao | ...................... | G06F 3/046 178/18.01 |
| 6,930,674 B2 * | 8/2005 | Katsurahira | ........... | G06F 3/046 178/19.04 |
| 6,937,231 B2 * | 8/2005 | Fujitsuka | ........... | G06F 3/03545 178/18.01 |
| 6,952,201 B2 * | 10/2005 | Fukushima | ............ | G06F 3/046 178/18.07 |

(56) References Cited

U.S. PATENT DOCUMENTS

| | | | |
|---|---|---|---|
| 7,005,843 B2* | 2/2006 | Matsubara | G06F 3/03545 324/678 |
| 7,019,672 B2* | 3/2006 | Ely | G06F 1/1626 178/20.04 |
| 7,082,213 B2* | 7/2006 | Black | G06F 3/03545 382/115 |
| 7,102,628 B2* | 9/2006 | LeKuch | G06F 1/1616 345/173 |
| 7,113,087 B1* | 9/2006 | Casebolt | G01V 3/101 340/539.1 |
| 7,149,647 B2 | 12/2006 | Katsurahira | |
| 7,279,646 B2* | 10/2007 | Xu | G06F 3/0346 178/18.01 |
| 7,423,629 B2* | 9/2008 | Oda | G06F 3/046 178/18.01 |
| 7,424,154 B2* | 9/2008 | Seto | G06K 9/222 382/181 |
| 7,474,300 B2* | 1/2009 | Katsurahira | G06F 1/3203 178/18.01 |
| 7,483,018 B2* | 1/2009 | Oliver | G06F 3/03545 178/19.01 |
| 7,511,705 B2* | 3/2009 | Silk | G06F 1/3203 345/179 |
| 7,526,737 B2* | 4/2009 | Simmons | G06F 3/03545 345/173 |
| 7,646,379 B1* | 1/2010 | Drennan | G06F 3/03545 178/18.01 |
| 7,656,390 B2 | 2/2010 | Oda | |
| 7,812,268 B2* | 10/2010 | Ely | G06F 3/03545 178/18.03 |
| 7,843,438 B2* | 11/2010 | Onoda | G06F 1/1616 345/156 |
| 7,868,873 B2* | 1/2011 | Palay | G06F 3/046 178/18.01 |
| 7,903,094 B2 | 3/2011 | Katsuhito et al. | |
| 7,936,343 B2* | 5/2011 | Lapstun | G06F 3/03545 178/18.01 |
| 8,022,937 B2* | 9/2011 | Palay | G06F 3/03545 178/18.01 |
| 8,063,322 B2* | 11/2011 | Katsurahira | G06F 3/046 178/19.01 |
| 8,072,431 B2* | 12/2011 | Nishi | C03C 21/001 345/173 |
| 8,089,008 B2* | 1/2012 | Katsurahira | G06F 3/03545 178/19.01 |
| 8,089,475 B2 | 1/2012 | Ito | |
| 8,094,140 B2* | 1/2012 | Katsurahira | G06F 3/03545 178/19.01 |
| 8,115,738 B2* | 2/2012 | Ito | G06F 1/1616 178/18.01 |
| 8,149,220 B2* | 4/2012 | Fukushima | G01D 5/2006 178/18.08 |
| 8,154,525 B2* | 4/2012 | Katsurahira | G06F 3/046 178/18.01 |
| 8,228,312 B2* | 7/2012 | Matsubara | G06F 3/03545 178/18.06 |
| 8,243,033 B2* | 8/2012 | Ely | G06F 1/3203 345/156 |
| 8,253,702 B2* | 8/2012 | Katsurahira | G06F 1/3203 178/18.01 |
| 8,304,671 B2* | 11/2012 | Fukushima | G06F 3/03545 178/19.03 |
| 8,368,669 B2* | 2/2013 | Katsurahira | G06F 1/32 178/18.01 |
| 8,373,683 B2* | 2/2013 | Katsurahira | G06F 3/03545 178/19.01 |
| 8,390,272 B2* | 3/2013 | Yokota | G06F 3/0416 178/18.06 |
| 8,525,816 B2* | 9/2013 | Fukushima | G06F 3/03545 178/18.01 |
| 8,564,564 B2* | 10/2013 | Chang | G06F 3/0416 345/156 |
| 8,587,565 B2* | 11/2013 | Fukushima | G06F 3/03545 200/502 |
| 8,780,056 B2* | 7/2014 | Yamamoto | G06F 3/0412 345/107 |
| 8,963,889 B2* | 2/2015 | Oda | G06F 3/046 178/19.03 |
| 8,982,044 B2* | 3/2015 | Katsurahira | G06F 3/03545 178/19.01 |
| 9,417,738 B2* | 8/2016 | Hargreaves | G06F 3/03545 |
| 2001/0006369 A1* | 7/2001 | Ely | G06F 1/1626 341/20 |
| 2001/0006383 A1* | 7/2001 | Fleck | G06F 3/03545 345/179 |
| 2002/0070927 A1* | 6/2002 | Fujitsuka | G01D 5/2006 345/179 |
| 2003/0047360 A1* | 3/2003 | Katsurahira | G06F 3/046 178/19.03 |
| 2003/0055655 A1* | 3/2003 | Suominen | G06F 3/167 704/276 |
| 2003/0062889 A1* | 4/2003 | Ely | G01D 5/2073 324/207.17 |
| 2003/0122795 A1* | 7/2003 | Fujitsuka | G06F 3/03545 345/173 |
| 2003/0142073 A1* | 7/2003 | Fukushima | G06F 3/046 345/158 |
| 2003/0217871 A1* | 11/2003 | Chao | G06F 3/046 178/18.01 |
| 2004/0169594 A1* | 9/2004 | Ely | G01D 5/2073 341/22 |
| 2004/0246230 A1* | 12/2004 | Oda | G06F 3/046 345/156 |
| 2005/0104865 A1* | 5/2005 | Oda | G06F 3/046 345/173 |
| 2005/0116940 A1* | 6/2005 | Dawson | G06F 3/03545 345/179 |
| 2005/0128191 A1* | 6/2005 | Katsurahira | G06F 1/3203 345/179 |
| 2005/0156915 A1* | 7/2005 | Fisher | G06F 3/0317 345/179 |
| 2005/0162398 A1* | 7/2005 | Eliasson | G06F 3/03545 345/173 |
| 2005/0166076 A1* | 7/2005 | Truong | G06F 1/1613 713/320 |
| 2005/0169504 A1* | 8/2005 | Black | G06F 3/03545 382/124 |
| 2005/0171714 A1* | 8/2005 | Ely | G06F 1/3203 702/75 |
| 2005/0174259 A1* | 8/2005 | Ely | G06F 3/046 341/5 |
| 2005/0180618 A1* | 8/2005 | Black | G06F 3/03545 382/124 |
| 2005/0200636 A1* | 9/2005 | Silverbrook | G06F 3/03545 347/2 |
| 2005/0280638 A1* | 12/2005 | Oda | G06F 3/046 345/173 |
| 2006/0158440 A1* | 7/2006 | Ashenbrenner | G06F 3/016 345/179 |
| 2006/0197755 A1* | 9/2006 | Bawany | G06F 1/266 345/179 |
| 2006/0215886 A1* | 9/2006 | Black | G06K 9/0002 382/124 |
| 2006/0250380 A1* | 11/2006 | Oliver | G06F 3/03545 345/179 |
| 2007/0085836 A1* | 4/2007 | Ely | G06F 3/03545 345/173 |
| 2007/0146351 A1* | 6/2007 | Katsurahira | G06F 3/03545 345/179 |
| 2007/0177533 A1* | 8/2007 | Palay | G06F 3/046 370/295 |
| 2007/0195069 A1* | 8/2007 | Kable | G06F 3/03545 345/179 |
| 2007/0227785 A1* | 10/2007 | Katsurahira | G06F 1/32 178/18.07 |
| 2007/0285389 A1 | 12/2007 | Ito | |
| 2008/0055279 A1* | 3/2008 | Osada | G06F 3/03545 345/179 |

(56) References Cited

U.S. PATENT DOCUMENTS

| | | | |
|---|---|---|---|
| 2008/0150914 A1* | 6/2008 | Yamamoto | G06F 3/046 345/175 |
| 2008/0164077 A1* | 7/2008 | Yamamoto | G06F 3/046 178/18.08 |
| 2008/0180411 A1* | 7/2008 | Solomon | G06F 3/03545 345/179 |
| 2008/0181143 A1* | 7/2008 | Palay | G06F 3/046 370/295 |
| 2008/0202824 A1 | 8/2008 | Philipp et al. | |
| 2008/0225011 A1* | 9/2008 | Ito | G06F 1/1616 345/173 |
| 2008/0238885 A1* | 10/2008 | Zachut | G06F 3/03545 345/174 |
| 2009/0000831 A1* | 1/2009 | Miller | G06F 3/03545 178/19.01 |
| 2009/0065268 A1* | 3/2009 | Katsurahira | G06F 3/046 178/19.01 |
| 2009/0065269 A1* | 3/2009 | Katsurahira | G06F 3/046 178/19.06 |
| 2009/0127003 A1* | 5/2009 | Geaghan | G06F 3/044 178/18.03 |
| 2009/0160790 A1* | 6/2009 | Fukushima | G01D 5/2006 345/173 |
| 2009/0184940 A1* | 7/2009 | Silk | G06F 1/3203 345/173 |
| 2010/0110029 A1* | 5/2010 | Yamamoto | G06F 3/0412 345/173 |
| 2010/0117994 A1* | 5/2010 | Fukushima | G06F 3/03545 345/179 |
| 2010/0295826 A1* | 11/2010 | Yeh | G06F 3/03549 345/179 |
| 2010/0315384 A1* | 12/2010 | Hargreaves | G06F 3/03545 345/179 |
| 2010/0321288 A1* | 12/2010 | Katsurahira | G06F 3/03545 345/156 |
| 2011/0069022 A1* | 3/2011 | Yokota | G06F 3/0416 345/173 |
| 2011/0090146 A1* | 4/2011 | Katsurahira | G06F 3/03545 345/156 |
| 2011/0193776 A1* | 8/2011 | Oda | G06F 3/046 345/157 |
| 2011/0193811 A1* | 8/2011 | Katsuhito | G06F 3/044 345/173 |
| 2011/0254807 A1* | 10/2011 | Perski | G06F 3/0418 345/174 |
| 2012/0007831 A1* | 1/2012 | Chang | G06F 3/0416 345/174 |
| 2012/0050207 A1* | 3/2012 | Westhues | G06F 3/03545 345/174 |
| 2012/0127132 A1* | 5/2012 | Katsurahira | G06F 3/03545 345/179 |

FOREIGN PATENT DOCUMENTS

| | | |
|---|---|---|
| EP | 1531389 A2 | 5/2005 |
| JP | 63070326 A | 3/1988 |
| JP | 7200137 A | 8/1995 |
| JP | 8030374 A | 2/1996 |
| JP | 2002215317 A | 8/2002 |
| JP | 2008-112415 A | 5/2007 |
| JP | 2007-249670 A | 9/2007 |
| JP | 2007257359 A | 10/2007 |
| TW | 200844825 A | 11/2008 |

OTHER PUBLICATIONS

Extended European Search Report dated Aug. 2, 2013, for corresponding EP Application No. 10187583.9, 10 pages.
Taiwanese Office Action dated Nov. 17, 2014, for corresponding TW application No. 099134221, 11 pages.
Japanese Office Action dated Mar. 24, 2015, for corresponding JP Application No. 2013-250371, 3 pages.

* cited by examiner

FIG.13 OPERATION WHEN COMMAND "110" IS TRANSMITTED IN SECOND EMBODIMENT

COORDINATE·PEN PRESSURE DETECTING OPERATION WHEN ERASER SIDE IS PLACED

POSITION DETECTOR AND POSITION INDICATOR

CROSS REFERENCE TO RELATED APPLICATIONS

The present application claims the benefit under 35 U.S.C. §119(a) of Japanese Patent Application No. 2009-240727, filed Oct. 19, 2009, the entire content of which is being incorporated herein by reference.

TECHNICAL FIELD

The present invention relates to a position indicator and a position detector which is configured to detect multiple types of information stored on a position indicator side including, for example, the position indicator's specific ID or the like, and information regarding a pen pressure or the like which is obtained in accordance with the use of the position indicator.

BACKGROUND

A position detector called a pen tablet has been developed as one of pointing devices used for photograph processing, illustration creation, or the like, on a computer apparatus. A pen tablet is generally composed of an approximately tabular position detector portion (hereinafter referred to as a "tablet"), and a pen-like dedicated position indicator which a user manipulates on the tablet.

In one such (pen tablet) position detector based on an electromagnetic induction system, a resonance circuit is provided in a position indicator, and a reflected signal from the position indicator resonating with a signal transmitted from a tablet is detected by the tablet, to thereby obtain a position on the tablet as indicated by the position indicator (for example, refer to Japanese Patent Laid-Open No. S63-70326).

In addition, there is also proposed a position detector having a form in which a tablet is integrated with a display device such as a liquid crystal panel, whereby a position displayed on a screen is directly inputted with a position indicator such as an electronic pen (for example, refer to Japanese Patent Laid-Open No. 2002-215317).

Still further, a position detector is proposed in which a position indicator is associated with not only its specific ID information and pen pressure information, but also with other multiple types of information, of which necessary information can be selected and acquired in accordance with an instruction issued from a tablet (for example, refer to Japanese Patent Laid-Open No. H7-200137).

Yet another position detector is proposed in which a power source is provided in a position indicator to transmit a signal, and a transparent sensor tablet including a coil made of material having a high resistance, such as an ITO (Indium Tin Oxide) film, is disposed on a front surface of a liquid crystal panel (for example, refer to Japanese Patent Laid-Open No. 2007-257359).

SUMMARY OF THE INVENTION

In the existing position detectors, such as the one disclosed in Japanese Patent Laid-Open No. 2007-257359, since the signal from the position indicator is detected by the loop coil made from the ITO film formed on the transparent glass surface, it is possible to dispose the sensor tablet on the front surface of the display device. For this reason, it becomes unnecessary to disassemble the liquid crystal panel in the manufacturing process to include the tablet in the position detector, which in turn enhances the interchangeability (compatibility) of the display device in design. In addition, since a power source is provided in the position indicator in order to transmit a signal, it becomes possible to increase the strength of the signal from the position indicator. Thus, the position detector does not suffer much influence by the noise radiated from the display device, and can stably detect the coordinates of the position indicator on the tablet.

However, in the position detector such as the one as shown in Japanese Patent Laid-Open No. H7-200137, multiple types of information including the position indicator's specific ID and the like are associated with the position indicator to allow for their detection by the tablet, all of those types of information need to be transmitted. As a result, a transfer speed is largely reduced.

According to one aspect, the present invention has been made in light of the problem described above. One embodiment of the present invention provides a position detector, wherein a power source is provided in a position indicator in order to transmit a signal. Multiple types of information including a specific ID and the like are set in the position indicator, and a tablet can select and acquire necessary information out of these multiple types of information. According to another aspect of the present invention, even in the case of a large display device, the sensor tablet can be disposed on a front surface thereof.

According to yet another aspect of the present invention, a low-power consumption position indicator is provided, in which a battery as a power source provided in the position indicator needs not be exchanged or charged frequently.

In one embodiment, a position detector of the present invention includes a position indicator including a power source and configured to intermittently transmit a position indication signal to a tablet at a predetermined timing; and the tablet configured to detect a position on its surface pointed to by the position indicator by receiving the position indication signal.

The position indicator further includes an information storing section configured to store therein multiple types of information; a control signal receiving circuitry configured to receive a control signal transmitted thereto from the tablet; an information selecting circuitry configured to select one type of information from among the multiple types of information stored in the information storing section in accordance with a content of the control signal; and an information transmitting circuitry configured to transmit the one type of information selected by the information selecting circuitry to the tablet.

The tablet includes a position signal receiving circuitry configured to receive a position indication signal from the position indicator; a timing information extracting circuitry configured to extract the predetermined timing from the position indication signal; and a control signal transmitting circuitry configured to transmit a control signal to the position indicator. In the tablet, the position indication signal intermittently transmitted from the position indicator is received by the position signal receiving circuitry, and the control signal is transmitted from the tablet to the position indicator synchronously with the predetermined timing extracted by the timing information extracting circuitry.

In other words, the tablet extracts the predetermined timing from the position indication signal transmitted from the position indicator. Then, the tablet transmits the control signal to the position indicator synchronously with the extracted predetermined timing and, at the same timing, the position indicator activates a receiving circuit.

Effects of the Invention

According to various embodiments of the present invention, since a control signal from the tablet is suitably amplified, even when the control signal from the tablet is a weak signal, the control signal can be reliably received by the position indicator. Thus, even when a loop coil of the tablet is composed of either a transparent electrode such as an ITO film or a material having a high resistance value, the tablet can select, based on the control information, the necessary information from among multiple types of information stored in the position indicator. For this reason, the transfer speed of the information from the position indicator to the tablet is not reduced, since only the necessary information can be obtained.

In addition, according to various embodiments of the present invention, since the control signal is transmitted from the tablet synchronously with the timing for the signal transmission from the position indicator, the control signal can be reliably transmitted/received during a short period of time. For this reason, it is possible to further increase the transfer speed of the information from the position indicator to the tablet.

In addition, according to various embodiments of the present invention, since the signal transmission from the position indicator is stopped when the position indicator does not exist on a tablet, the power consumption of the position indicator can be reduced, and its battery need not to be exchanged or charged frequently.

DESCRIPTION OF THE INVENTION

Hereinafter, embodiments for carrying out the invention will be described. It is noted that the description will be given below in accordance with the following order.

1. First Embodiment (basic constitution example).
2. Modifications to the First Embodiment.
3. Second Embodiment (example in which a position indicator having rotational angle information is used).
4. Third Embodiment (example in which a position indicator including a pen tip and an eraser is used).

<1. First Embodiment>

[Description of External Appearance of a Position Detector]

Figure 1:
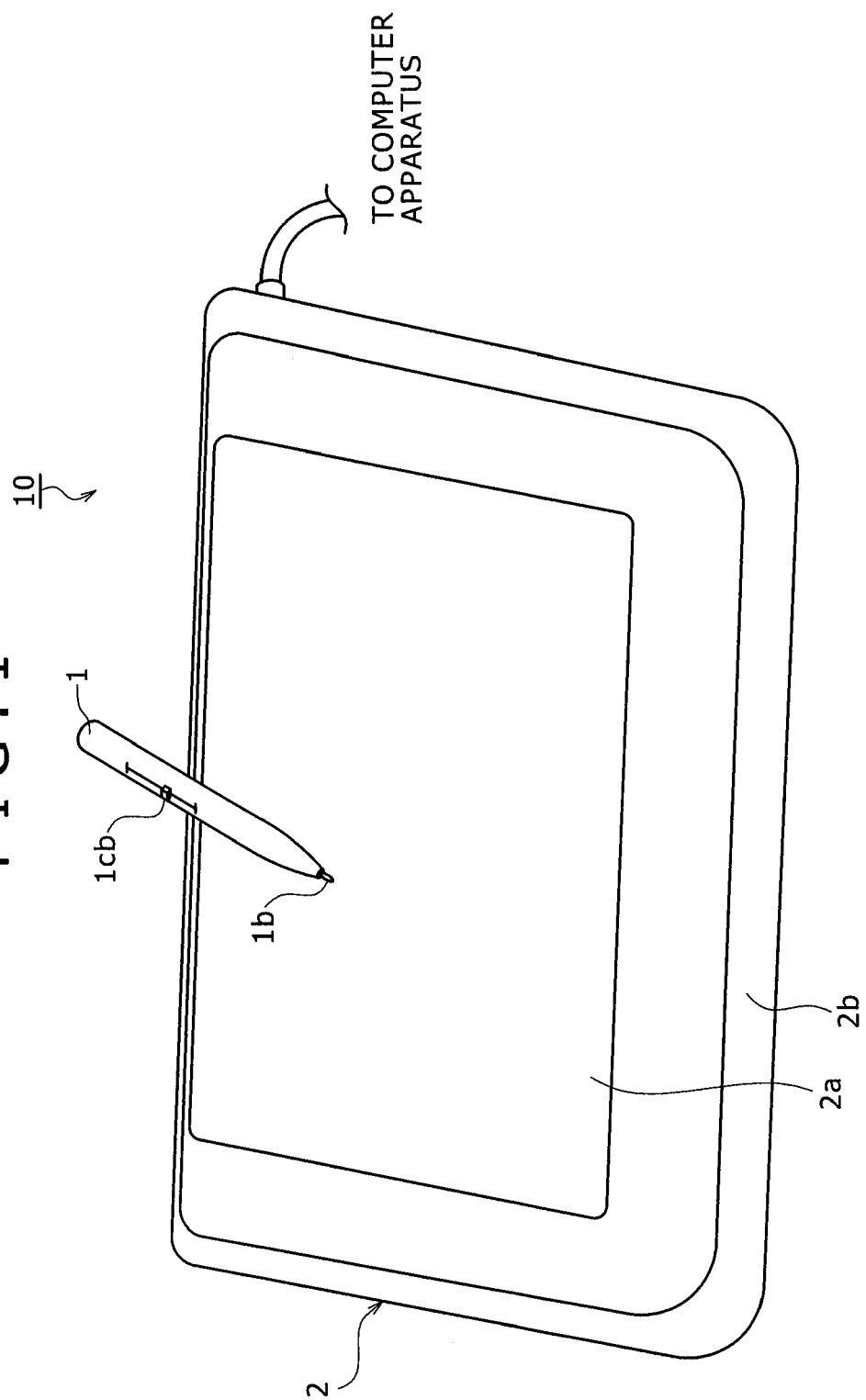
FIG. 1 is an external view of a position detector according to a first embodiment of the present invention.

FIG. 1 shows an external view of an embodiment of a position detector 10 of the present invention. The position detector 10 according to this embodiment is composed of a pen-shaped position indicator 1 and a tablet 2.

The position indicator 1 is used on a position detection area 2a of the tablet 2. A position (coordinates) indicated by the position indicator 1 can be detected on the position detection area 2a. In addition, the position indicator is provided with a side lever (hereinafter referred to as "a slider") 1cb which can be moved vertically in a longitudinal direction of the position indicator 1. Thus, a color, a thickness, or the like of a pen can be set by adjusting a position of the slider 1cb. In addition, the position indicator 1 can detect information regarding the pen pressure applied to its pen tip portion (e.g., by the tablet surface). Moreover, specific ID information used to individually identify the position indicator 1 is stored in the position indicator.

In this embodiment, information regarding a position of the slider 1cb (hereinafter referred to as "slider information"), pen pressure information, the ID information individually assigned to the position indicator 1, and the like, are transmitted from the position indicator 1 to the tablet 2 for a period of time different from a period of time allocated for coordinate detection during which the tablet detects the position indicated by the position indicator.

The tablet 2 is connected to an external computer apparatus (not shown). The tablet detects the coordinate position indicated by the position indicator, and outputs the detected coordinate information, as well as information regarding the pen pressure and the like, to the computer apparatus. The computer apparatus executes necessary processing based on the coordinate information, information regarding the pen pressure, and the like, as received from the tablet 2.

In the tablet of this embodiment, a tablet sensor for detecting a signal from the position indicator is constructed in the form of a plurality of transparent loop coils (not shown) composed of an ITO (Indium Tin Oxide) film. These transparent loop coils are disposed on a display portion 2*b* composed of a liquid crystal panel and the like. When commands that request various types of information are transmitted from the tablet 2 to the position indicator 1, each of the command signals which are transmitted becomes weak because the resistance value of the transparent loop coils is as high as several kilo-ohms to several tens of kilo-ohms.

For this reason, in this embodiment, the signal received by the position indicator 1 from the tablet 2 is amplified, thereby making it possible to properly detect the presence or absence of the signal. At this time, the commands transmitted from the tablet side can be expressed as a chronological series of the presence or absence of a signal. Also, the operational timing is matched between the position indicator and the tablet, to allow for precise transmission/reception of each of the commands in a short period of time. The details of these operations will be described later.

[Configuration of a Position Indicator]

Figure 2:
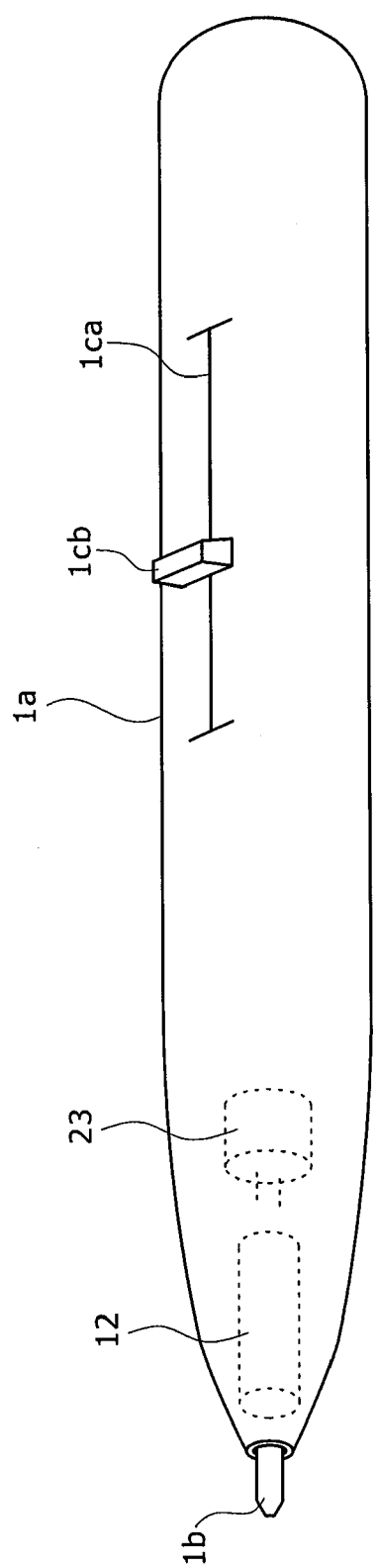
FIG. 2 is an external view of a position indicator according to the first embodiment of the present invention.

Next, a configuration of the position indicator will be described with reference to FIG. 2. The position indicator has a pen-like shape. Reference symbol 1*b* designates a pen rod (core). A tip portion of the rod 1*b* protrudes from a main body 1*a*. The position indicator is used to contact a tablet surface with the tip portion of the rod 1*b* as a "pen tip." Reference numeral 12 designates a hollow-shaped coil. The rod 1*b* extends completely through the coil 12. In addition, a variable-capacitance capacitor 23 is disposed on a side of the rod 1*b*, which is opposite to the tip portion of the rod 1*b*.

The variable-capacitance capacitor 23 changes its capacitance in accordance with a magnitude of the pen pressure applied to the rod 1*b*. A load applied to the variable-capacitance capacitor 23 is detected as the pen pressure information by a pen pressure detecting circuit 21, which will be described later.

A groove 1*ca* having a predetermined length in a longitudinal direction is provided in the main body 1*a*. A slider 1*cb* which is slidable between one end portion and the other end portion of the groove 1*ca* is mounted to the groove 1*ca*. Analog information on the movement of the slider 1*cb* on the groove 1*ca* is detected by a slider detecting circuit 22, which will be described later.

Figure 3:
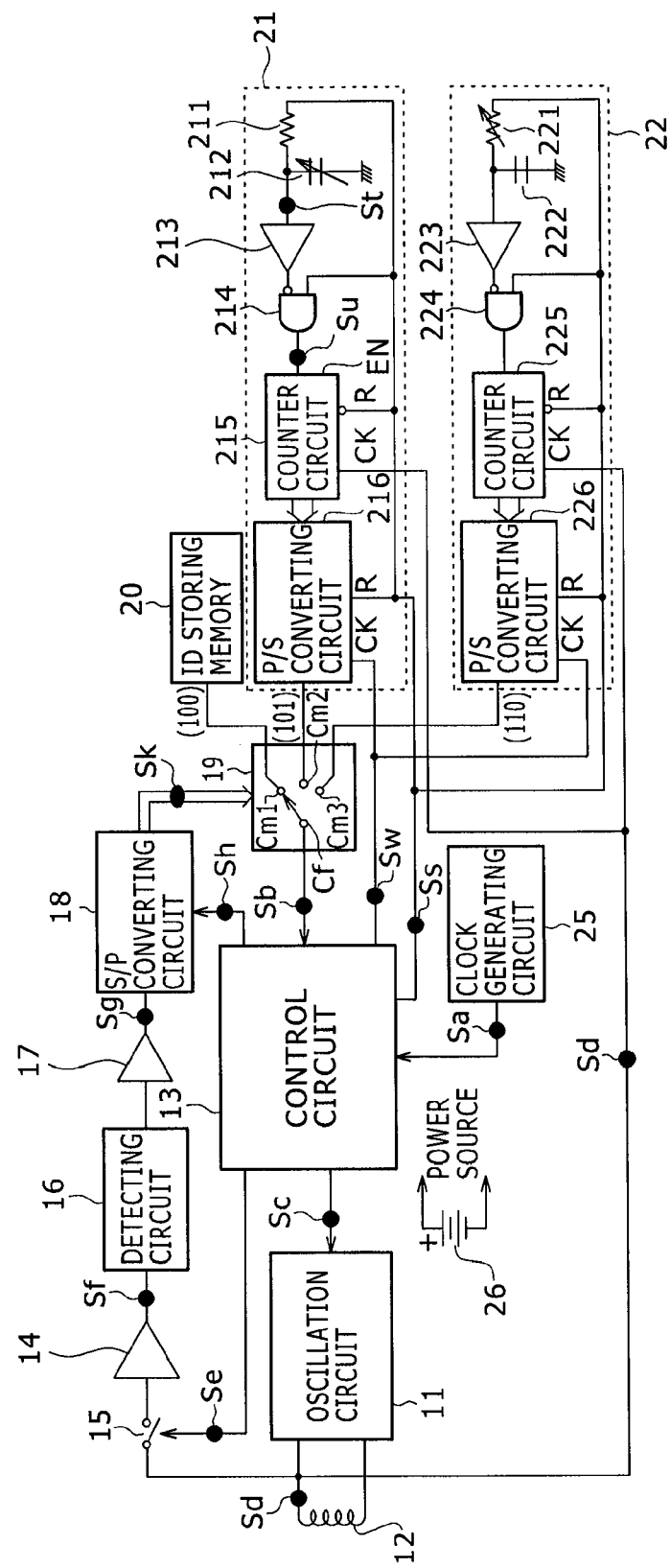
FIG. 3 is a block diagram showing an internal configuration of the position indicator according to the first embodiment of the present invention.

FIG. 3 is a block diagram showing an example of an internal configuration of the position indicator. The position indicator is provided with an oscillation circuit 11, a coil 12, a control circuit 13, an amplifying circuit 14, a switch 15, a detecting circuit 16, a comparator 17 as a signal strength determining portion, a serial-to-parallel converting circuit 18 (hereinafter referred to as "an S/P converting circuit 18"), a switching circuit 19, an ID storing memory 20, a pen pressure detecting circuit 21, a slider detecting circuit 22, a clock generating circuit 25, and a power source 26.

The oscillation circuit 11 is a circuit which is operated together with the coil 12 in accordance with an oscillation control signal Sc supplied thereto from the control circuit 13, thereby generating a coil signal Sd having a predetermined frequency in the coil 12. The coil 12 generates an AC magnetic field in accordance with the coil signal Sd. The tablet detects the AC magnetic field generated from the coil 12 of the position indicator, thereby obtaining the information regarding the coordinates indicated by the position indicator, the pen pressure, and the like.

The control circuit 13 carries out control for the portions that form the position indicator. Specifically, the control circuit 13 supplies the oscillation signal Sc to the oscillation circuit 11 described above, supplies an S/P conversion clock Sh to the S/P converting circuit 18 which will be described later, supplies a continuous amount detection pulse Ss, a continuous amount sending clock Sw, and the like, to the pen pressure detecting circuit 21 and the slider detecting circuit 22 which will be described later, and the like. Details of these various kinds of control signals will be described later. A CPU (Central Processing Unit) can be used as the control circuit 13.

The amplifying circuit 14 is connected to the coil 12 through the switch 15, and amplifies the signal induced in the coil 12 by the tablet. The detecting circuit 16 outputs a voltage corresponding to a level of the output signal from the amplifying circuit 14. The comparator 17 detects whether or not the output voltage from the detecting circuit 16 is equal to or greater than a given voltage, and outputs a detection result as a digital signal.

The S/P converting circuit 18 reads the digital signal outputted from the comparator 17 at every cycle of the S/P conversion clock Sh supplied thereto from the control circuit 13, and converts the read result into parallel data, thereby outputting a resulting parallel data to the switching circuit 19. In this embodiment, the S/P converting circuit 18 outputs a 3-bit selection signal Sk.

The switching circuit 19 selects any one of the ID storing memory 20, the pen pressure detecting circuit 21, and the slider detecting circuit 22 in accordance with a selection signal Sk outputted thereto from the S/P converting circuit 18, and supplies a signal from the selected circuit to the control circuit 13.

The ID storing memory 20 is composed of a semiconductor memory or the like, and stores therein ID numbers individually assigned to the position indicators. The pen pressure detecting circuit 21 detects the pen pressure applied to the rod 1*b* (refer to FIG. 2), and outputs information regarding the pen pressure thus detected in the form of a digital value. The slider detecting circuit 22 detects slider information of the slider 1*cb* and outputs the slider information thus detected in the form of a digital value.

Each of the pen pressure detecting circuit 21 and the slider detecting circuit 22 is operated in accordance with the continuous amount detection pulse Ss supplied thereto from the control circuit 13. The continuous amount detection pulse Ss is a signal used to specify a period of time during which a continuous amount, such as the pen pressure or the information regarding an operational amount of the slider 1*cb*, is detected. In this embodiment, the continuous amount detection pulse Ss is supplied during a period of time for continuous transmission, which will be described later.

A resistor 211, a variable-capacitance capacitor 212, a comparator 213, an AND gate 214, a counter circuit 215, and a P/S converting circuit 216 are included in the pen pressure detecting circuit 21.

The variable-capacitance capacitor 212 and the resistor 211 compose a time constant circuit. When the continuous amount detection pulse Ss is inputted to the time constant circuit, a signal St is outputted whose rising speed (rate of rise) is changed in accordance with a capacitance of the variable-capacitance capacitor 212.

The comparator 213 has a given threshold, and converts the signal St into a digital signal in accordance with the threshold set therein. The AND gate 214 has one inverting input and one non-inverting input. An output signal from the comparator 213 is applied to a terminal on the inverting input side, and the continuous amount detection pulse Ss is applied to a terminal on the non-inverting input side. By adopting such a configuration, a pen pressure detection signal Su, whose pulse width is changed in accordance with the pen pressure applied to the variable-capacitance capacitor 212, is outputted from the AND gate 214.

The counter circuit 215 is provided with an enable terminal EN, a clock input terminal CK, and a reset terminal R. A pen pressure detection signal Su outputted from the AND gate 214 is inputted to the enable terminal EN, and a coil signal Sd from the oscillation circuit 11 is supplied to the clock input terminal CK. Also, the continuous amount detection pulse Ss is inputted to the reset terminal R.

The counter circuit 215 counts the coil signal Sd inputted to the clock input terminal CK only during a period of time of the pulse width of the pen pressure detection signal Su supplied to the enable terminal EN, and outputs a count value to the P/S converting circuit 226. It is noted that during a period of time when the continuous amount detection pulse Ss inputted to the reset terminal R is held at a Low level, the count value by the counter circuit 215 is reset. Since in this embodiment, the pen pressure information is expressed in the form of data of 10 bit, the data outputted by the counter circuit 215 also has 10 bits. It is noted that although in this embodiment, the pen pressure information is expressed in the form of 10 bits, the number of bits is by no means limited thereto.

The P/S converting circuit 216 fetches the 10-bit data transmitted thereto from the counter circuit 215 at a rise timing of the continuous amount detection pulse Ss supplied thereto from the control circuit 13. After that, the P/S converting circuit 216 successively outputs the 10-bit data received from the counter circuit 215 to the switching circuit 19 synchronously with the continuous amount sending clock Sw from the control circuit 13.

The slider detecting circuit 22 is composed of a variable resistor 221, a capacitor 222, a comparator 223, an AND gate 224, a counter circuit 225, and a P/S converting circuit 226. The variable resistor 221 is configured to change its resistance value in accordance with the operational state (position) of the slider 1*cb*. The variable resistor 221 and the capacitor 222 compose a time constant circuit. When the continuous amount detection pulse Ss is inputted to the time constant circuit, a signal whose rate of rise is changed in accordance with a resistance value of the variable resistor 221 is outputted, similarly to the case of the pen pressure detecting circuit 21 described above. Since the operations of the other circuits are the same as those in the pen pressure detecting circuit 21, a description thereof is omitted. It is noted that a variable-resistance capacitor, an inductance element, or the like may be used instead of using the variable resistor 221.

The clock generating circuit 25 generates a clock signal Sa and supplies the generated clock signal Sa to the control circuit 13. The control circuit 13 sets the timings for various kinds of operations synchronously with the clock signal Sa. A relatively low frequency, for example, about 8 kHz may be adopted for the clock signal Sa. The power source 26 may be a battery, as a power source for driving the circuits described above.

[Construction of a Tablet]

Figure 4:
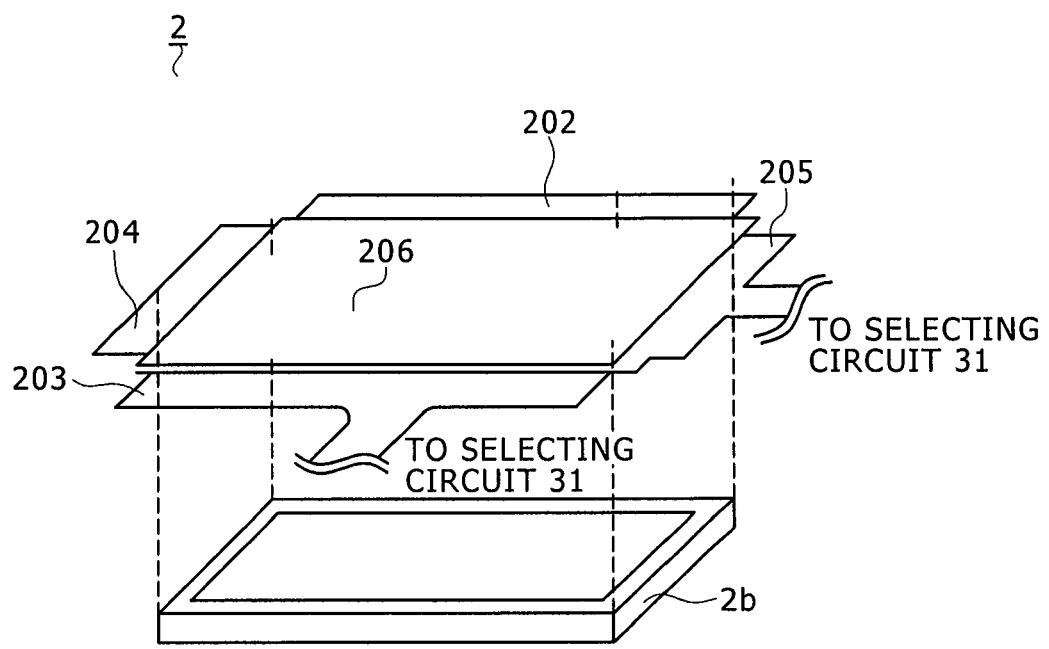
FIG. 4 is a perspective exploded view showing a construction of a tablet according to the first embodiment of the present invention.

Next, the construction of a tablet will be described with reference to FIG. 4. The tablet is constructed by stacking a sensor glass 206 on an upper surface of a display portion 2*b* composed of a liquid crystal panel and the like. Flexible substrates 202, 203, 204, 205 are coupled to the sensor glass 206.

The sensor glass 206 is obtained by, for example, sticking two sheets of glasses each having a thickness of about 0.4 mm to each other. A pattern of a loop coil group 30 (not shown) made from the ITO film is formed on each of the glasses. The loop coil group 30 is composed of loop coils X1 to X40 (not shown in FIG. 4) arranged in an X-axis direction, and loop coils Y1 to Y30 (not shown in FIG. 4) arranged in a Y-axis direction, for example.

The pattern of the loop coils arranged in the X-axis direction is formed on one of the two sheets of glasses by etching, and the pattern of the loop coils arranged in the Y-axis direction is formed on the other of the two sheets of glasses also by etching. These glasses are made so as to sandwich a transparent insulating sheet between them, with the surfaces of the ITO films being arranged to face each other. It is noted that details of the disposition of the loop coils will be described later with reference to FIG. 5.

The flexible substrate 202 is formed, for example, with a polyimide material as a base, and is connected to the pattern of lines of the loop coils X1 to X40 on the sensor glass 206. Also, folding portions for forming the loops, respectively, are disposed on the flexible substrate 202. The flexible substrate 203 is formed, for example, also with a polyimide material as the base and is connected to the pattern of the lines of the loop coils X1 to X40 on the sensor glass 206. A terminal derived from the flexible substrate 203 is connected to a selecting circuit 31, which will be described later.

Likewise, the flexible substrate 204 is formed, for example, with a polyimide material as the base and is connected to the pattern of lines of the loop coils Y1 to Y30 on the sensor glass 206. Also, folding portions for forming the loops, respectively, are disposed on the flexible substrate 204. The flexible substrate 205 is formed, for example, also with a polyimide material as the base and is connected to the pattern of the lines of the loop coils Y1 to Y30 on the sensor glass 206. A terminal derived from the flexible substrate 205 is connected to the selecting circuit 31, which will be described later.

Next, an internal configuration of the tablet will be described with reference to FIG. 5. The tablet is composed of the loop coil group 30, the selecting circuit 31, a CPU 33 (control portion), a switching circuit 34, an amplifying circuit 35, a band-pass filter 36 (hereinafter referred to as "a BPF 36"), a detecting circuit 37, an S/H circuit 38, an A/D converting circuit 39, a switch 40, and a signal generating circuit 41. As described above, the loop coil group 30 is disposed in the form of the loop coils X1 to X40 in the X-axis direction, and the loop coils Y1 to Y30 in the Y-axis direction.

Figure 5:
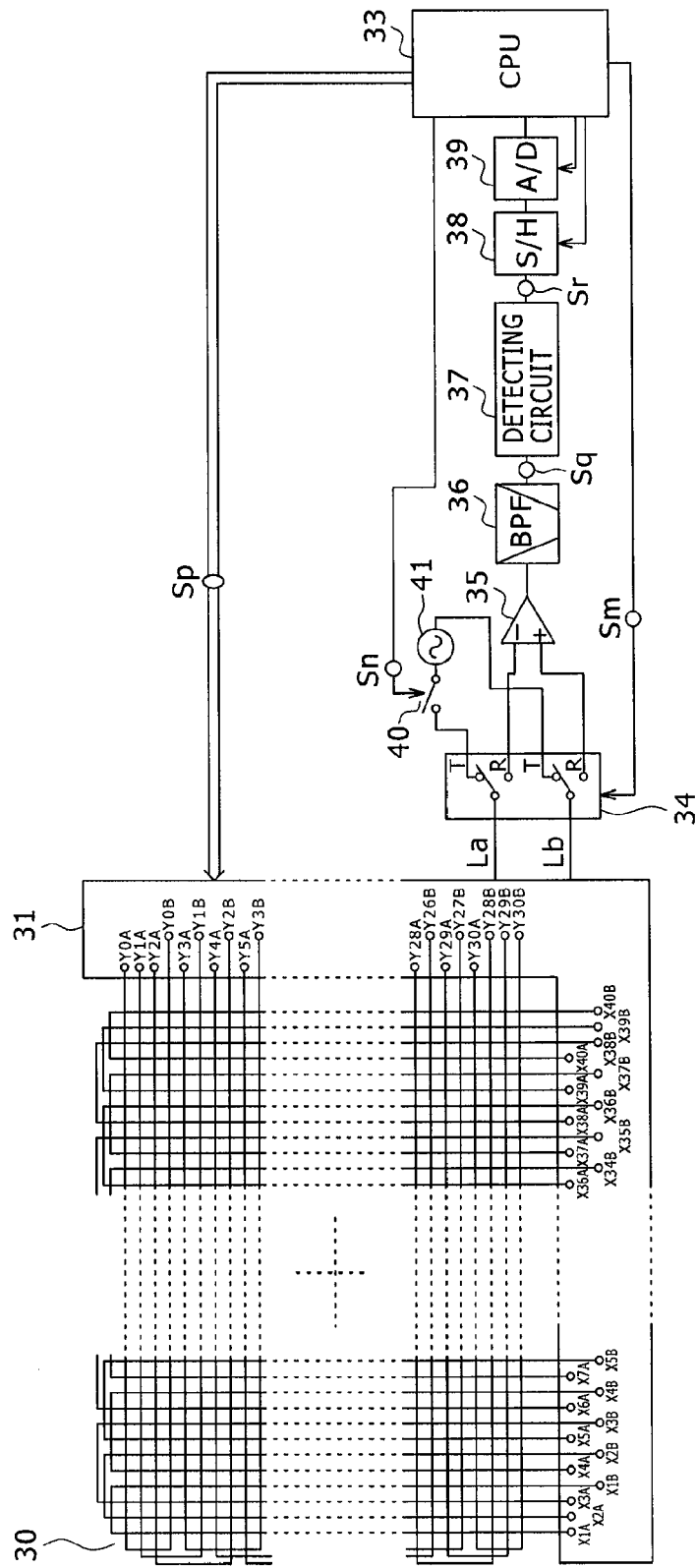
FIG. 5 is a block diagram showing an internal configuration of the tablet according to the first embodiment of the present invention.

It is noted that in FIG. 5, both ends of one loop coil are represented by addition of reference symbols A and B, respectively. For example, both ends of the loop coil X1 are represented by X1A and X1B, respectively.

The size and arrangement pitch of the loop coil group 30 are determined so that the position detection area 2a (refer to FIG. 1) composed of the loop coil group 30 matches with the display area of the display portion 2b. Also, start points and end points of the loop coils X1 to X40 and the loop coils Y1 to Y30 composing the loop coil group 30 are connected to the selecting circuit 31 so that corresponding ones of the loop coils can be selected. Specifically, the selecting circuit 31 selects one set of terminals as a line La and a line Lb from each of the loop coils arranged in the X-axis direction and the loop coils arranged in the Y-axis direction in accordance with a coil selection signal Sp supplied thereto from the CPU 33.

The line La and the line Lb selected by the selecting circuit 31 are both connected to the switching circuit 34. The switching circuit 34 can connect each of connection destinations of the line La and the line Lb either to a transmission side (T) or to a reception side (R) in accordance with a transmission/reception switching signal Sm supplied thereto from the CPU 33.

When the switching circuit 34 connects each of the connection destinations of the line La and the line Lb to the reception side (R), the loop coil selected by the selecting circuit 31 is connected to the amplifying circuit 35 through the line La and the line Lb. The amplifying circuit 35 amplifies the signal transmitted thereto from the coil 12 of the position indicator.

An output terminal of the amplifying circuit 35 is connected to the BPF 36, and the BPF 36 extracts only a desired frequency component from the output signal of the amplifying circuit 35, to thereby output the desired frequency component thus extracted in the form of an output signal Sq. The output signal Sq from the BPF 36 is supplied to the detecting circuit 37, and the detecting circuit 37 outputs a voltage corresponding to a level of the output signal Sq from the BPF 36.

The S/H circuit 38 and the A/D converting circuit 39 periodically convert a voltage of a detected signal Sr outputted from the detecting circuit 37 into a digital value in accordance with control from the CPU 33.

When the switching circuit 34 connects each of the connection destinations of the line La and the line Lb over to the transmission side (T), the loop coil selected by the selecting circuit 31 is connected to the signal generating circuit 41 through the switch 40. Thus, an AC current is caused to flow through the selected loop coil when the switch 40 is held in an ON state. The ON state and an OFF state of the switch 40 are changed over to each other in accordance with a transmission control signal Sn supplied thereto from the CPU 33. The ON state and the OFF state of the switch 40 are changed over to each other time-sequentially to transmit a control signal to the position indicator.

The control signal includes command information such as a command requesting the ID information ("100" in this embodiment), a command requesting the pen pressure information ("101" in this embodiment), a command requesting the slider information ("110" in this embodiment), or the like. It is noted that the commands are by no means limited to these examples, and thus when the position indicator has information other than the information on the pen pressure, its ID, and the slider, other commands may be used in accordance with which these other pieces of information are acquired.

[Operation of the Embodiment]

Next, an operation of this embodiment will be described. It is noted that the description will be given below in accordance with the following order.
(1) Period of Time for Coordinate Detection.
(2) Period of Time for Command Transmission.
(3) Period of Time for Timing Extraction.
(4) Period of Time for Data Reception.
(5) Initial Operation When a Position Indicator is Put down on a Tablet.

Although the actual operation is carried out in the order of (5), and (1) to (4), the description will be given below in accordance with the order described above to render the description easy to follow and understand.

Figure 6:
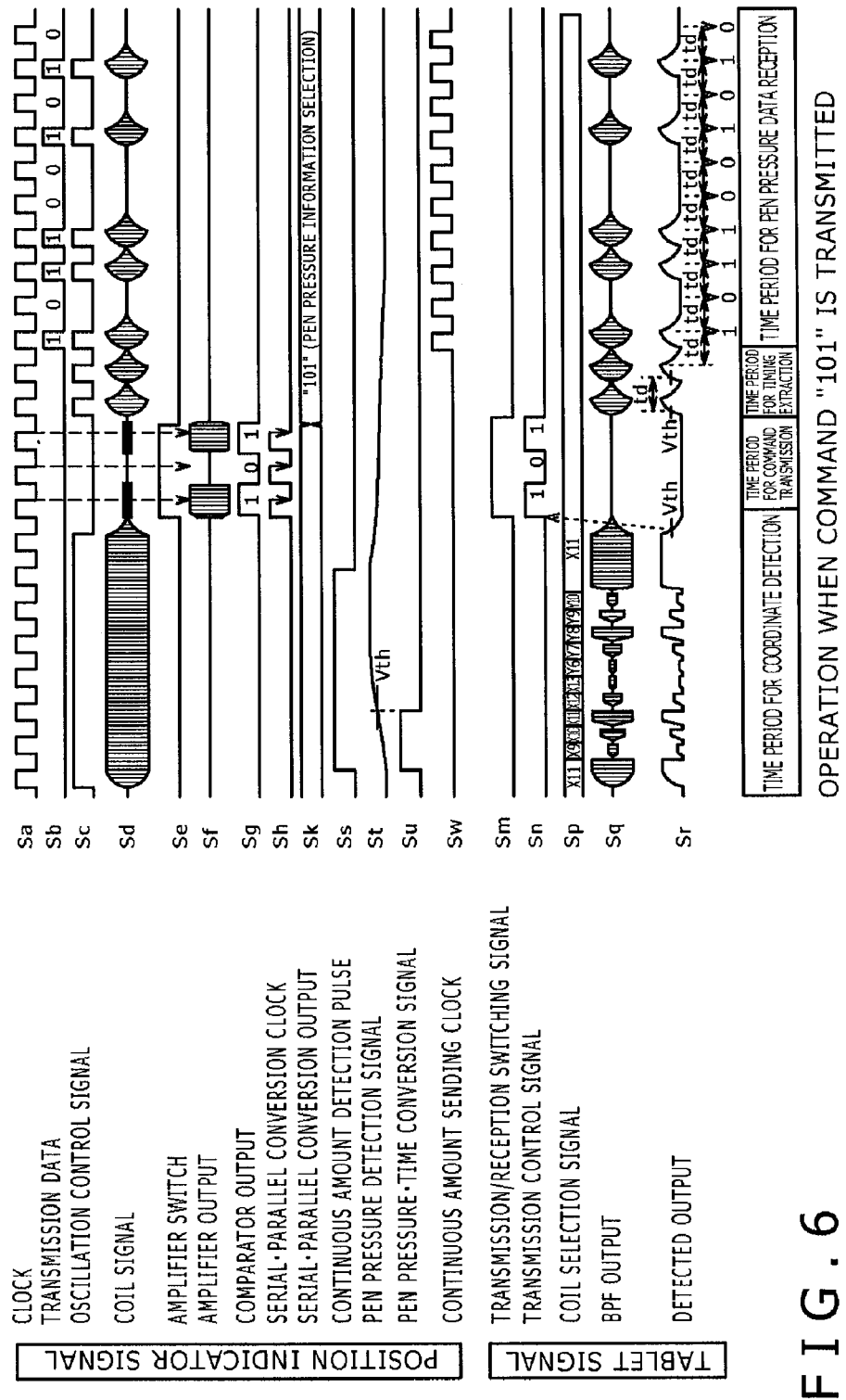
FIG. 6 is a timing chart showing operations of the position indicator and the tablet when a command of "101" is transmitted from the tablet, according to the first embodiment of the present invention.
Figure 7:
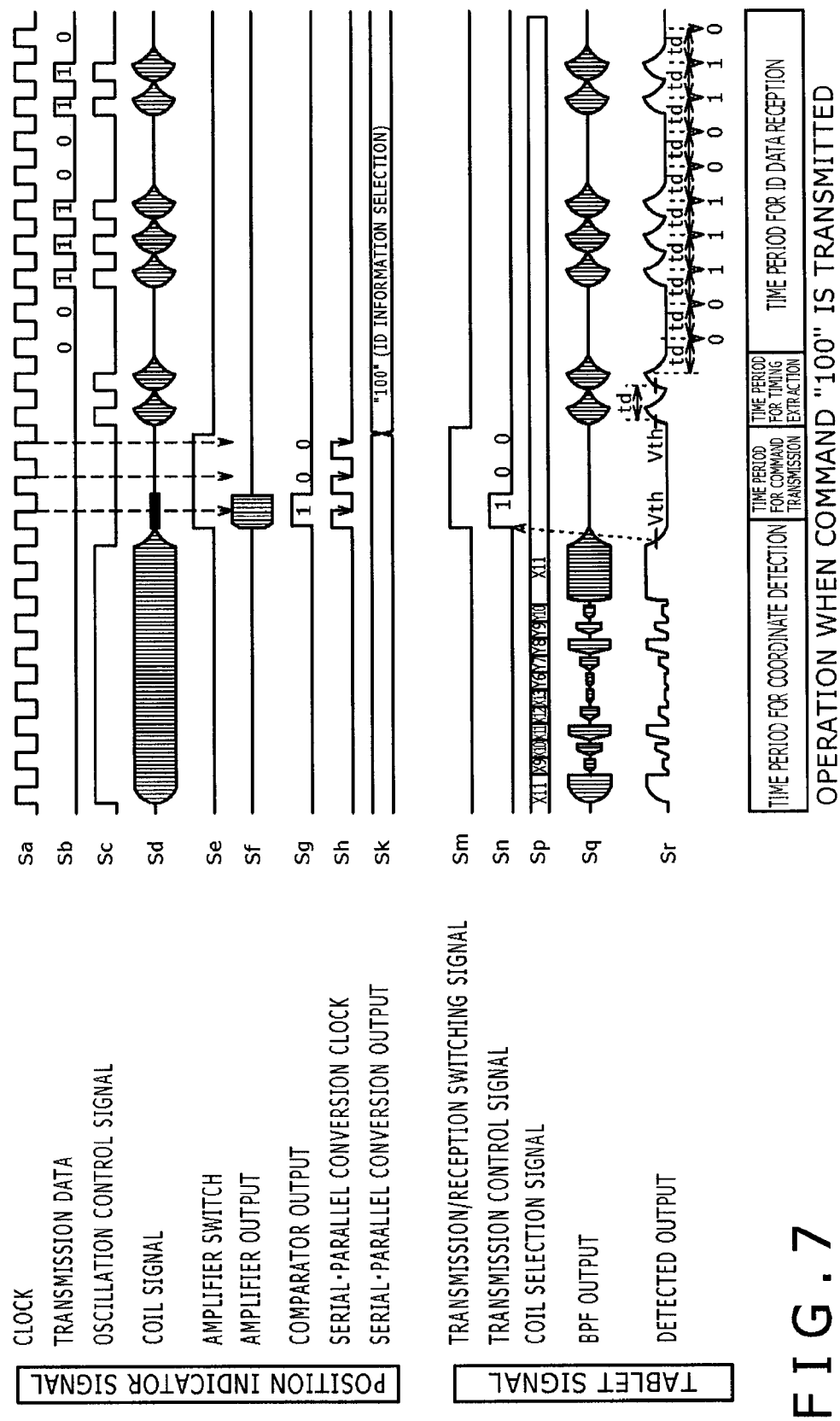
FIG. 7 is a timing chart showing operations of the position indicator and the tablet when a command of "100" is transmitted from the tablet, according to the first embodiment of the present invention.
Figure 8:
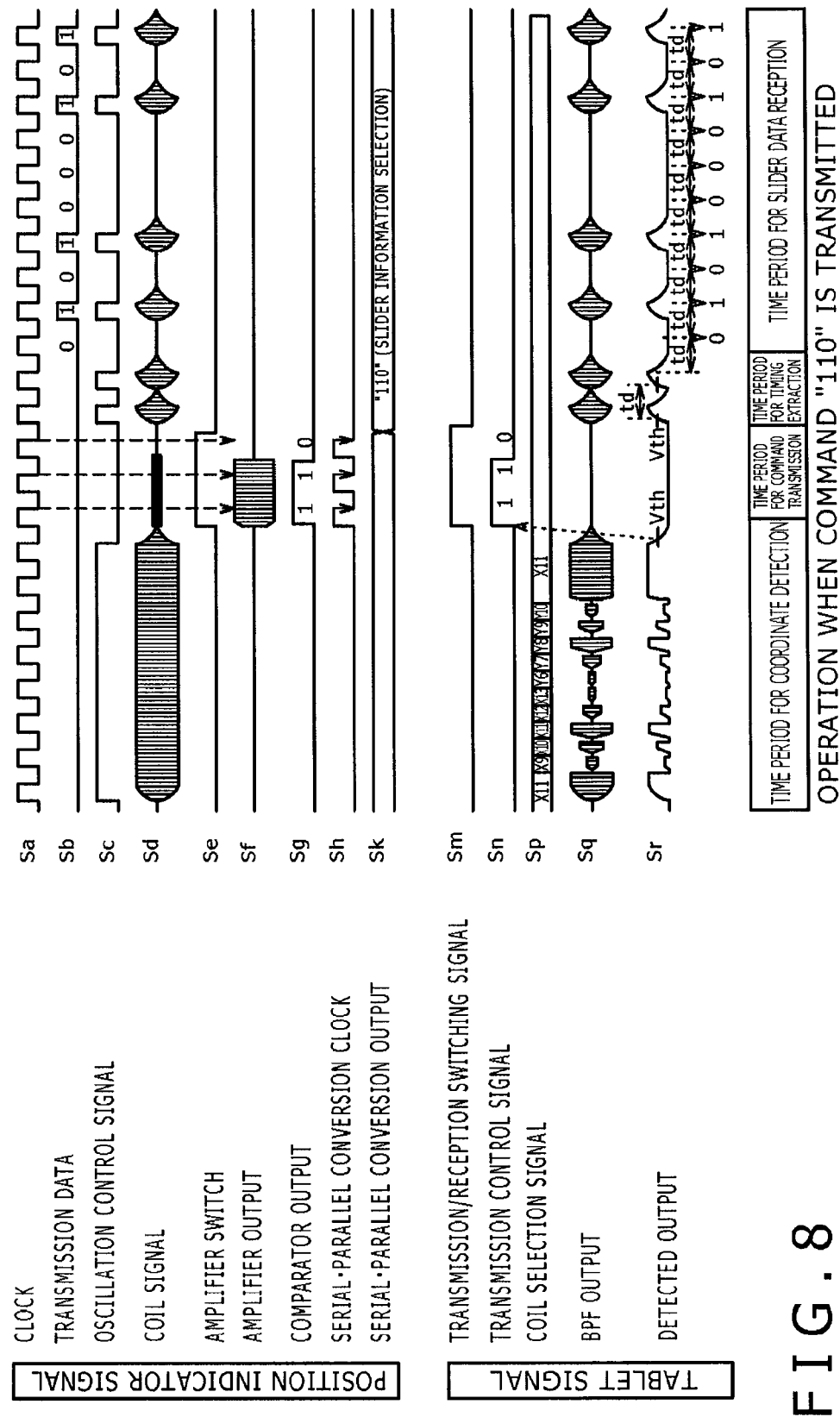
FIG. 8 is a timing chart showing operations of the position indicator and the tablet when a command of "110" is transmitted from the tablet, according to the first embodiment of the present invention.

FIG. 6 shows an operation for detecting the pen pressure information of the position indicator, by transmitting the command of "101" as the control signal for the position indicator. FIG. 7 shows an operation for detecting the ID information of the position indicator by transmitting the command of "100" as the control signal for the position indicator. FIG. 8 shows an operation for detecting the slider information of the position indicator by transmitting the command of "110" as the control signal for the position indicator. In FIGS. 6 to 8, an abscissa axis of each of the clock signals Sa to Sr represents time, and the clock signals Sa to Sr represent the signal waveforms in the portions in FIGS. 3 and 5 designated by the same reference symbols Sa to Sr, respectively.

Note that, in FIGS. 6 to 8, the description is given on the assumption that the position indicator is placed in the vicinity of an intersection point between the loop coil X11 and the loop coil Y8 on the sensor glass 206 of the tablet, and by carrying out the initial operation which will be described later, the CPU 33 has already recognized that the position indicator is placed in the vicinity of the intersection point between the loop coil X11 and the loop coil Y8.

(Operation when Command "101" is Transmitted)

An operation when the command of "101" for requiring to transmit the pen pressure information is transmitted from the tablet to the position indicator will be described with reference to FIG. 6.

(1) Period of Time for Coordinate Detection

The control circuit 13 of the position indicator supplies the oscillation control signal Sc to the oscillation circuit 11 so that the signal is continuously transmitted from the coil 12 during a time period required by the tablet to detect the coordinates, for example, for 1 msec or more. As a result, while the oscillation control signal Sc is supplied, a coil signal Sd is generated in the coil 12, and an AC magnetic field caused by the coil signal Sd is transmitted. This operation is referred to as a continuously transmitting operation. A period of time during which the position indicator carries out the continuously transmitting operation is a period of time during which the coordinate detection is carried out in the tablet, and is also a period of time during which the pen pressure information and the slider information, which will be described later, are detected in the position indicator.

For the purpose of detecting a timing at which the continuously transmitting operation by the position indicator is started, the CPU 33 of the tablet first (previously) sends a coil selection signal Sp used to select the loop coil X11 (or Y8) to the selecting circuit 31. In addition, the CPU 33 sends the transmission/reception switching signal Sm, which causes the switching circuit 34 to connect each of the connection destinations of the line La and the line Lb to the reception side (R).

At this time, if the coil signal Sd is transmitted from the coil 12 of the position indicator, a voltage must be found in the detected output Sr from the detecting circuit 37 within the tablet.

The CPU 33 checks the output result from the A/D converting circuit 39, and determines that the continuously transmitting operation from the position indicator is started when the voltage is continuously generated in the detected output Sr for a given time period, for example, for a period of 128 μsec or more. This operation is carried out to distinguish such a continuously transmitted signal from a signal which is intermittently transmitted from the position indicator during a period of time for data reception, which will be described later. The CPU 33 subsequently carries out the coordinate detecting operation.

For the purpose of obtaining the signal levels from the five loop coils with the loop coil X11 at the center, the CPU 33 sends a coil selection signal Sp so as to successively select the loop coils X9 to X13. The coil selection signal Sp is sent to carry out the successive selection at every period of time, for example, of 64 μsec, for one loop coil.

At this time, a voltage corresponding to a distance between the selected loop coil and the coil 12 of the position indicator appears in the detected output Sr from the detecting circuit 37. In other words, a voltage distribution is obtained such that the highest voltage is obtained when the loop coil X11 closest to the position indicator is selected (Sr in FIG. 6). The X-coordinate of the position indicated by the position indicator can be obtained from a peak level and the voltage across the coils adjacent to each other in the voltage distribution.

Subsequently, for the purpose of obtaining the signal levels from the five loop coils with the loop coil Y8 at the center, the CPU 33 sends a coil selection signal Sp so as to successively select the loop coils Y6 to Y10. In this case as well, similarly to the case where the X-axis loop coils are selected, the successive selection is carried out at every period of time of, for example, 64 μsec, for one loop coil. At this time, a voltage corresponding to a distance between the selected loop coil and the coil 12 of the position indicator appears in the detected output Sr from the detecting circuit 37. In other words, a voltage distribution is obtained such that the highest voltage is obtained when the loop coil Y8 closest to the position indicator is selected (Sr in FIG. 6). The Y-coordinate of the position indicated by the position indicator can be obtained from a peak level and the voltage across the coils adjacent to each other in the voltage distribution.

Next, for the purpose of waiting for completion of the continuously transmitting operation from the position indicator, the CPU 33 sends a coil selection signal Sp used to select the loop coil X11 (or Y8) to the selecting circuit 31. At this time, in the coordinate detecting operation described above, if the peak voltage which was generated in the loop coil (referred to as "the central coil") has been moved to the loop coil adjacent to that loop coil, the position indicated by the position indicator is determined to be moved, and thus the central coil thus updated is selected. Since the voltage of the detected output Sr is gradually reduced when the continuous transmission from the position indicator has been completed, the CPU 33 determines that the continuous transmission has been completed when the voltage of the detected output Sr becomes equal to or smaller than a given threshold Vth, and the operation of the CPU 33 proceeds to a command transmitting operation which will be next described.

While the coordinate detecting operation in the tablet is carried out, that is, while the coil signal Sd is continuously transmitted from the position indicator, the pen pressure detecting operation and the slider detecting operation are also carried out by the pen pressure detecting circuit 21 and the slider detecting circuit 22 within the position indicator, respectively. Although in this embodiment, the pen pressure detecting operation and the slider detecting operation are carried out at the same time, hereinafter, the pen pressure detecting operation will be described.

When the continuously transmitting operation described above is started, the control circuit 13 of the position indicator sends the continuous amount detection pulse Ss for a period of time until the oscillation output from the oscillation circuit 11 is sufficiently stabilized, for example, after a lapse of 64 μsec. When the continuous amount detection pulse Ss is inputted from the control circuit 13 to the pen pressure detecting circuit 21, a signal St appears on the output side of the time constant circuit, whose rate of rise changes in accordance with the pen pressure as described above. In addition, a pen pressure detection signal Su is outputted from the AND gate 214, whose pulse width changes in accordance with the pen pressure.

The pen pressure detection signal Su is inputted to the enable terminal EN of the counter circuit 215. Also, the number of waves of the coil signal Sd inputted to the clock input terminal CK of the counter circuit 215 is counted only during a period of time of a pulse width of the pen pressure detection signal. A numerical value counted is outputted as the pen pressure information of 10 bits from the P/S converting circuit 216.

(2) Period of Time for Command Transmission

When the voltage of the detected output Sr has become equal to or smaller than the given threshold Vth, signaling detection of the completion of the continuous transmission, the operation of the CPU 33 of the tablet proceeds to a command transmitting operation. At this time, the selecting circuit 31 maintains a state in which the loop coil closest to the position indicator is kept selected.

The CPU 33 sends the transmission/reception switching signal Sm, which causes the switching circuit 34 to connect each of the connection destinations of the line La and the line Lb to the transmission side (T). In addition, the CPU 33 sends the transmission control signal Sn to the switch 40. "1," "0," and "1" are successively outputted as the transmission control signal Sn at, for example, every 128 μsec.

For a period of time during which the transmission control signal Sn is held at "1," the signal generating circuit 41 is connected to the loop coil selected by the selecting circuit 31, and thus an AC current is caused to flow through the loop coil selected by the selecting circuit 31. The current caused to flow is not much because the loop coil is made from the ITO film, and thus the resistance value thereof is as large as several kilo-ohms to several tens of kilo-ohms. However, since a distance between the coil 12 of the position indicator and the loop coil is relatively short, a signal having, for example, about several milli-volts is generated in the coil 12 of the position indicator.

After completion of the continuously transmitting operation, the control circuit 13 of the position indicator outputs such a control signal Se as to hold the switch 15 in an ON state only for a period of time of three cycles of the clock signal Sa. When the signal is outputted from the loop coil of the tablet during this period of time, an amplifier output Sf appears in the output of the amplifying circuit 14, which causes an output Sp from the comparator 17 to become "1."

At this time, if a period of time (128 μsec in this case) during which the signal of 1 bit is transmitted from the tablet is made to approximately match the period of the clock signal Sa in the position indicator, the signal transmitted from the tablet can be extracted synchronously with the clock signal Sa.

In other words, if a value of the output Sg from the comparator 17 is read at a falling timing of the clock signal Sa as shown in FIG. 6, the signal transmitted from the tablet can be extracted in the order of "1," "0," and "1." When "101" is supplied as the selection signal Sk from the S/P converting circuit 18 to the switching circuit 19, the switching circuit 19 selects the output data from the pen pressure detecting circuit 21 and sends the output data thus selected as the transmission data Sb.

In other words, in the position indicator, a period of time during which transmission is stopped is set after completion of the continuously transmitting operation, and during this period a signal from the tablet is received as a command. On the other hand, in the tablet, upon detecting the completion of the continuously transmitting operation from the position indicator, transmission of a command to the position indicator is immediately started. The series of operations described above are one of the features of the present invention.

(3) Period of Time for Timing Extraction

When a command of 3 bits from the tablet has been detected in the position indicator, the control circuit 13 of the position indicator carries out a signal transmission twice synchronously with the clock signal Sa. Specifically, for a period of time during which the clock signal Sa is held at "1," the control circuit 13 carries out a control such that the oscillation control signal Sc also becomes "1," whereby as shown in FIG. 6, the intermittent signal synchronized with the clock signal Sa is transmitted twice from the coil 12.

When the transmission of the command of 3 bits ("101" in this case) has been completed on the tablet side, the CPU 33 sends the transmission/reception switching signal Sm, which causes the switching circuit 34 to connect each of the connection destinations of the line La and the line Lb to the reception side (R). As a result, the loop coil selected by the selecting circuit 31 is connected to the amplifying circuit 35, and thus the signal based on the two transmissions from the position indicator described above is detected, so that the detected output Sr appears as shown in FIG. 6.

At this time, in the CPU 33, a time at which the result from the A/D converting circuit 39 exceeds the given threshold Vth is measured twice, whereby an interval between the times of the two measurements is obtained in the form of "td." The time td should approximately match the period of the clock signal Sa of the position indicator. After that, the CPU 33 can precisely extract the data transmitted thereto from the position indicator, by detecting a signal at every td.

(4) Period of Time for Data Detection

When the two signal transmissions have been completed in the position indicator, the pen pressure detecting circuit 21 sends the pen pressure information in the form of the transmission data Sb synchronously with a rising of the subsequent clock signal Sa.

FIG. 6 shows an example in the case where the pen pressure information is expressed in the form of 10 bits of "1011001010." The transmission data Sb representing the pen pressure information is outputted 1 bit by 1 bit synchronously with the clock signal Sa as shown in FIG. 6.

At this time, the control circuit 13 sends the coil signal Sd when the transmission data Sb is "1," and does not send the coil signal Sd when the transmission data Sb is "0." In addition, an interval of the data sending operations approximately agrees with the time td obtained on the tablet side.

While the signal from the loop coil X11 (or Y8) is continuously detected in the tablet, a voltage equal to or greater than the given threshold Vth is generated in the detected output Sr when the transmitted data from the position indicator is "1." On the other hand, no voltage is generated in the detected output Sr when the transmitted data from the position indicator is "0."

The CPU 33 sets a point of time slightly later than the time, at which the detected output Sr exceeds the given threshold Vth for the second time during the period of time for the timing extraction described above, as a basing point, and checks the output result from the A/D converting circuit 39 at every integer multiple of the time td. Then, "1" is stored when the output from the A/D converting circuit 39 exceeds the above given threshold Vth, while "0" is stored when the output from the A/D converting circuit 39 is smaller than the above given threshold Vth. By repetitively carrying out this operation 10 times, the CPU 33 completes the reception of the pen pressure information of 10 bits transmitted thereto from the position indicator. At "the point of time slightly later than the time, at which the detected output Sr exceeds the given threshold Vth for the second time" described above, it is assumed that a cycle (period) which is, for example, a quarter of that of the clock signal Sa is set.

After completion of the transmission of the pen pressure information, the control circuit 13 of the position indicator starts to carry out the continuously transmitting operation described above again in order to allow the tablet to continuously carry out the coordinate detection.

(Operation when Command "100" is Transmitted)

FIG. 7 shows an operation when the command of "100" is transmitted from the tablet to the position indicator, thereby detecting the ID information.

FIG. 7 is different from FIG. 6 in that the data of 3 bits transmitted from the loop coil of the tablet during the period of time for command transmission is "100." The signal is extracted in the order of "1," "0," and "0" in the comparator output Sg in the position indicator, and the S/P converting circuit 18 supplies the information of "100" as the selection signal Sk to the switching circuit 19. The switching circuit 19 selects the signal from the ID storing memory 20 corresponding to the command of "100," and supplies that signal in the form of the transmission data Sb to the control circuit 13. FIG. 7 shows the case where the ID information stored in the ID storing memory 20 is expressed in the form of 10 bits of "0011100110."

(Operation when Command "110" is Transmitted)

FIG. 8 shows an operation for transmitting the command of "110" from the tablet to the position indicator, thereby requesting the slider information.

FIG. 8 is different from FIG. 6 in that the data of 3 bits transmitted from the loop coil of the tablet during the period of time for the command transmission is "110." The signal is extracted in the order of "1," "1," and "0" in the comparator output Sg in the position indicator, and the S/P converting circuit 18 supplies the information of "110" as the selection signal Sk to the switching circuit 19. The switching circuit 19 selects the signal from the slider detecting circuit 22 corresponding to the command of "110," and supplies the signal thus selected in the form of the transmission data Sb to the control circuit 13. FIG. 8 shows the case where the slider information from the slider detecting circuit 22 is expressed in the form of 10 bits of "0101000101." It is noted that although not illustrated in FIG. 8, the slider detecting circuit 22 carries out the same operation as that of the pen pressure detecting circuit 21 in accordance with the continuous amount detection pulses Ss to Sw as shown in FIG. 6, to thereby detect the slider information described above.

(5) Initial Operation when a Position Indicator is Put on a Tablet.

Next, a description will be given regarding how the operation proceeds to the operations described above and shown in FIGS. 6 to 8, respectively, when the position indicator is put on the tablet from a state in which there is no position indicator on the tablet. In this embodiment, a description will now be given with respect to a first example and a second example, in both of which there is no position indicator on the tablet.

(5)-1 First Example of Initial Operation.

Figure 9:
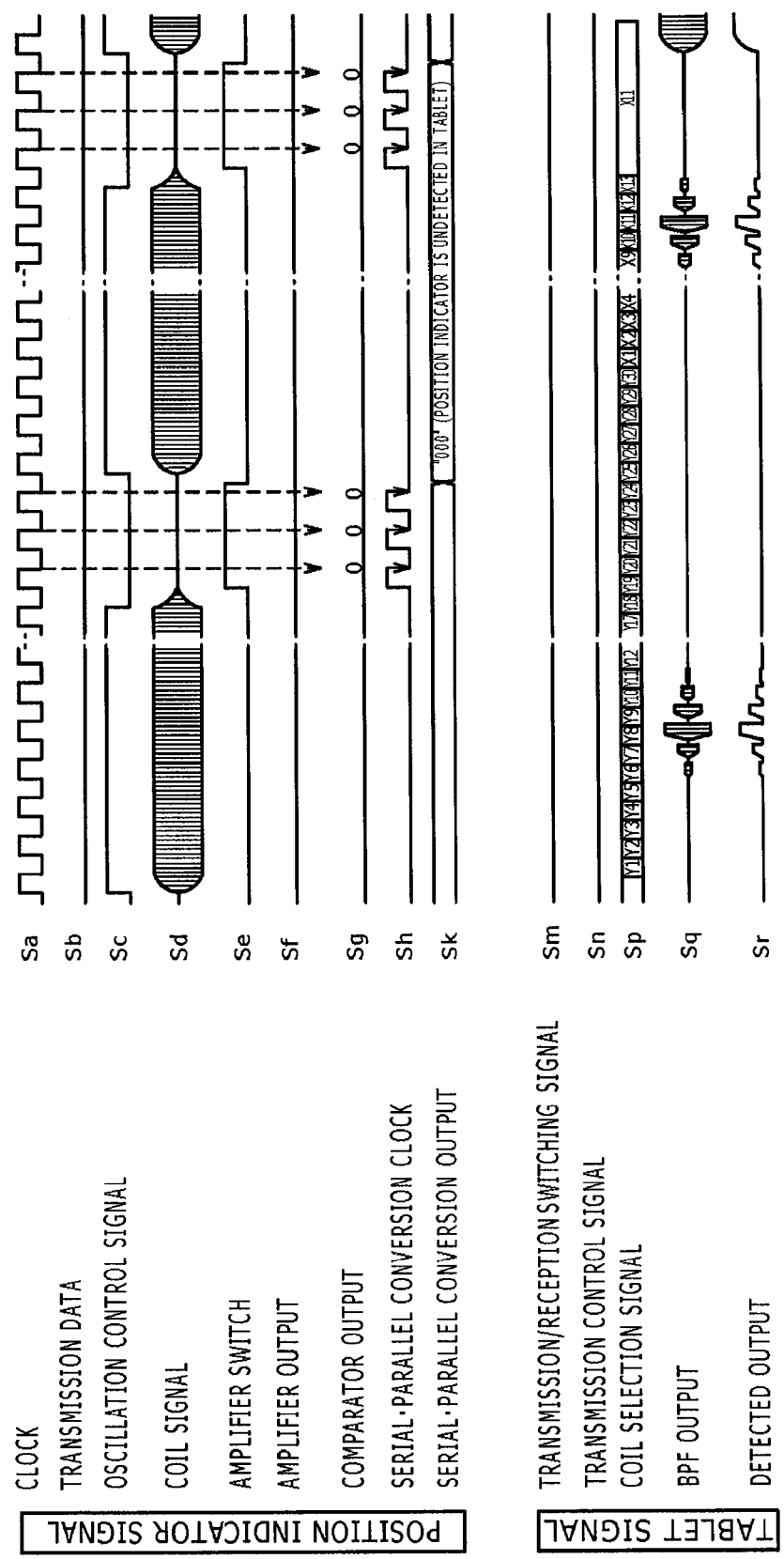
FIG. 9 is a timing chart showing an initial operation of a first example of the first embodiment of the present invention.

FIG. 9 shows the first example of an initial operation when the position indicator is put on the tablet. In FIG. 9, an abscissa axis of each of the clock signals Sa to Sr represents time, and the clock signals Sa to Sr represent the signal waveforms in the portions in FIGS. 3 and 5 designated by the same reference symbols Sa to Sr, respectively.

In this illustrative embodiment, the position indicator alternately repeats the continuously transmitting operation and the command receiving operation for receiving a command from the tablet, which are the same as those previously described with reference to FIG. 6. When a signal (the received data other than "000") is received during a period of time for which the command receiving operation is carried out (hereinafter referred to as "a period of time for command reception"), the position indicator is determined to be placed on the tablet. Also, the position indicator transmits a signal corresponding to the output data from the ID storing memory 20, the pen pressure detecting circuit 21, or the slider detecting circuit 22 to the tablet in accordance with the contents of the received command.

On the other hand, when no signal (the received data of "000") is received during the period of time for the command reception, the position indicator is determined not to be placed on the tablet. Thus, the position indicator repetitively carries out the continuously transmitting operation.

For the purpose of detecting the signal from the position indicator, in the tablet, the CPU 33 sends the transmission/reception switching signal Sm, which causes the switching circuit 34 to connect each of the connection destinations of the line La and the Lb to the reception side (R). In addition, the CPU 33 outputs such a coil selection signal Sp to the selection circuit 31 as to successively select the loop coils Y1 to Y30 with a period of time of, for example, 64 μsec being allocated to each loop coil.

At this time, when the position indicator is put on the tablet, as shown in FIG. 9, the level of the detected output Sr becomes high when the loop coil is selected, which is in the vicinity of the position where the position indicator is put on the tablet. The CPU 33 stores the number (Y8 in this case) of the loop coil in which the highest voltage appears. Subsequently, the CPU 33 outputs such a coil selection signal Sp as to successively select the loop coils X1 to X40 with a period of time of, for example, 64 μsec being allocated to one loop coil. At this time, the CPU 33 stores the number (X11 in this case) of the loop coil in which the highest voltage appears.

FIG. 9 shows that the high voltage is detected when the loop coil X11 is selected, and the detected voltages become gradually lower in the order when the loop coil X12 and the loop coil X13 are successively selected. As a result, the CPU 33 can recognize that the position indicator is put on the loop coil X11.

For this reason, the CPU 33 completes the selection of the loop coil at the loop coil X13 and outputs such a coil selection signal Sp as to select the loop coil X11 (or Y8) in which the strongest signal is detected. After that, the CPU 33 waits for a start of the continuously transmitting operation from the position indicator, and the operation of the CPU 33 proceeds to the operation of the coordinate detection period as shown in FIGS. 6 to 8 at a point of time when the start of the continuously transmitting operation is detected.

It is noted that in FIG. 9, the CPU 33 of the tablet cannot detect a signal when the time at which the loop coil closest to the position indicator is selected happens to fall within the period of time during which the transmission from the position indicator is stopped (i.e., the period of time for the command reception in the position indicator). However, by determining these timings in such a way that a cycle through which all of the loop coils Y1 to Y30 and the loop coils X1 to X40 are selected does not become an integer multiple of a cycle at which the continuously transmitting operation from the position indicator is repetitively carried out, it can be ensured that a signal from the position indicator is detected at least by the second round of the processing.

(5)-2 Second Example of Initial Operation.

Figure 10:
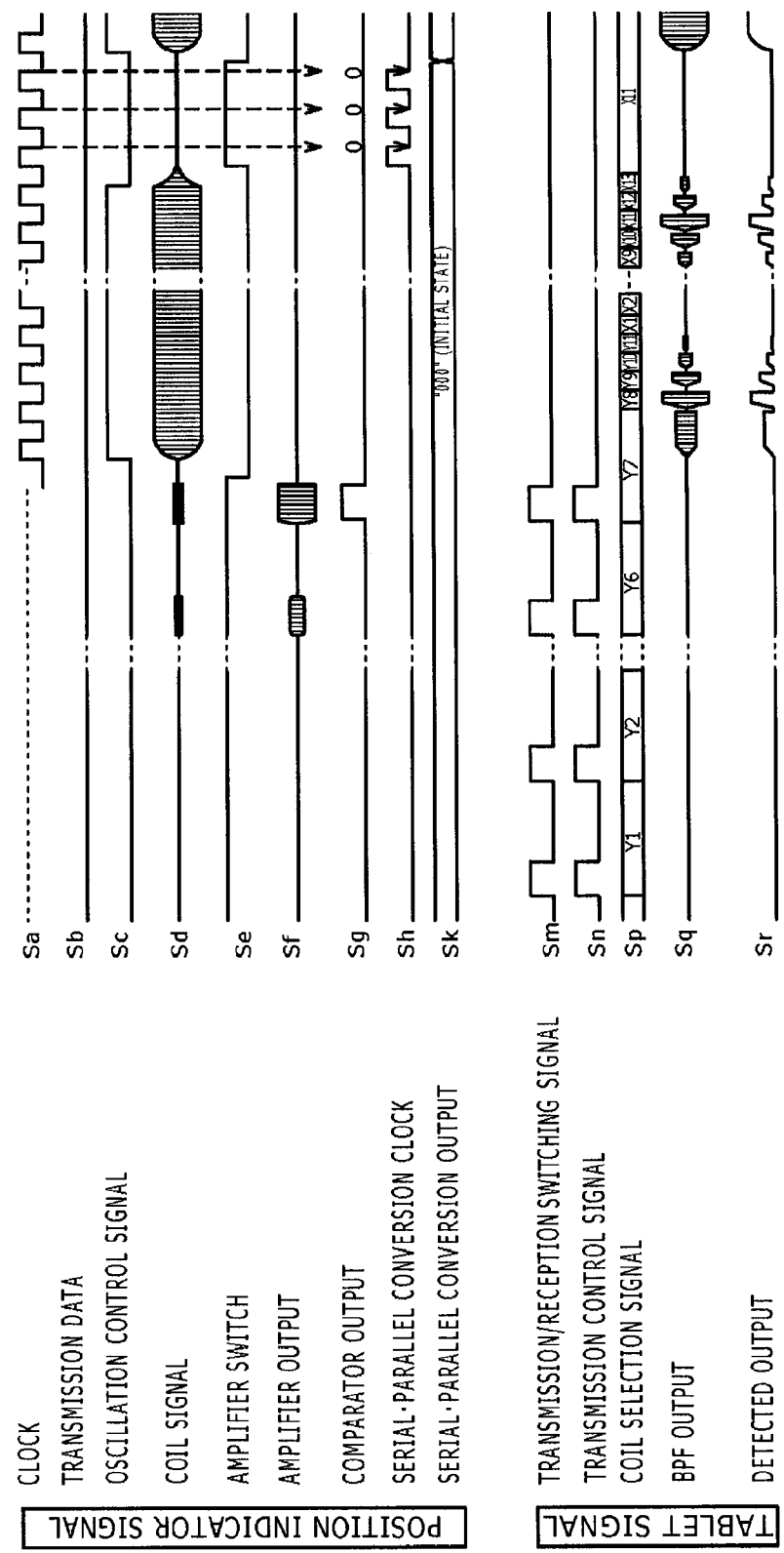
FIG. 10 is a timing chart showing an initial operation of a second example of the first embodiment of the present invention.

FIG. 10 shows a second example of the initial operation when the position indicator is put on the tablet. In FIG. 10, an abscissa axis of each of the clock signals Sa to Sr represents time, and the clock signals Sa to Sr represent the signal waveforms in the portions in FIGS. 3 and 5 designated by the same reference symbols Sa to Sr, respectively.

In this illustrative embodiment, the control signal Se is sent such that the position indicator does not transmit a signal and further that the control circuit 13 of the position indicator turns ON the switch 15 to thereby operate the amplifying circuit 14 (hereinafter referred to as "a pause state").

The CPU 33 of the tablet outputs such a coil selection signal Sp to the selection circuit 31 as to successively select the loop coils Y1 to Y30. At this time, a time during which one loop coil is selected is made sufficiently longer than the cycle of the clock signal Sa of the position indicator.

The CPU 33 carries out a control in such a way that for a period of time during which one loop coil is selected, the transmission/reception switching signal Sm is switched from the transmission side (T) to the reception side (R), and at the same time the transmission control signal Sn is switched from ON to OFF (refer to FIG. 10). As a result, the receiving operation is carried out following the transmitting operation when one loop coil is selected.

When the position indicator is put on the tablet (on the loop coil Y8 in this case), the coil signal Sd appears in the coil 12 in the position indicator when the loop coil near the loop coil Y8 is selected. The coil signal Sd at this time is much weaker than the signal when the oscillation circuit 11 is operated. However, the coil signal Sd is inputted to the amplifying circuit 14 through the switch 15, and the amplifier output Sf and the comparator output Sg appear from the amplifying circuit 14 and the comparator 17, respectively, as shown in FIG. 10. In this case, the comparator output Sg rises when the loop coil Y7 is selected.

The control circuit 13 of the position indicator sends a control signal Se such that the switch 15 is turned OFF as soon as the comparator output Sg is detected through a path (not shown), thereby stopping the operation of the amplifying circuit 14. Subsequently, the control circuit 13 of the position indicator outputs the oscillation control signal Sc to the oscillation circuit 11, thereby starting the continuously transmitting operation. By carrying out the continuously transmitting operation, the position indicator carries out the same operation as the initial operation in the first example described above, that is, the operation for repetitively carrying out the continuous transmission. This operation is one of the features of the present invention.

Since the continuously transmitting operation carried out by the position indicator is started during a period of time in which the tablet side selects the loop coil Y7, the detected output Sr from the tablet appears during this period of time as shown in FIG. 10. The CPU 33 recognizes that the position indicator has been placed on the tablet by detecting the detected output Sr.

In addition, for the purpose of checking the loop coil closest to the position indicator, the CPU 33 subsequently switches the selection of the loop coils one after another in the order of the loop coil Y8 and the loop coil Y9. In this case, since the signal transmission from the position indicator has already started, only reception needs to be carried out without transmission.

In FIG. 10, the highest voltage is detected when the loop coil Y8 is selected. However, as the CPU 33 switches the loop coil one after another in the order of the loop coil Y9, the loop coil Y10, and the loop coil Y11, the voltage of the detected output Sr becomes gradually lower. Therefore, the CPU 33 can recognize that the position indicator exists on the loop coil Y8.

When the selection up to the loop coil Y11 has been completed, for the purpose of determining of which of the loop coils in the X-axis the position indicator is put in the vicinity, the CPU 33 successively selects the loop coils X1 to X40, thereby carrying out the receiving operation.

In other words, the CPU 33 detects the highest detected output Sr when the loop coil X11 is selected, and as the CPU 33 subsequently switches the loop coils one after another in the order of the loop coil X12, and the loop coil X13, the voltage of the detected output Sr becomes gradually lower. Therefore, the CPU 33 can recognize that the position indicator exists on the loop coil X11. For this reason, the CPU 33 completes the selection of the loop coil at the loop coil X13, and selects the loop coil X11 (or Y8) in which the strongest signal is detected. In FIG. 10, the time at which the selection of the loop coil X13 has been completed agrees with the timing at which the continuous transmission from the position indicator is completed. At this time, however, when the continuous transmission from the position indicator is still continuing, the CPU 33 selects the loop coil X11 (or Y8), whereby the detected output Sr is generated again. The CPU 33 waits for the temporary completion of the continuous transmission from the position indicator while looking at the voltage of the detected output Sr, and thereafter detects the timing at which the continuous transmission is started again. In such a manner, the operation of the CPU 33 proceeds to the operation of the coordinate detection period in FIGS. 6 to 8.

In this illustrative example also, the CPU 33 cannot detect a signal from the X-axis coil when the time at which the X-axis loop coil closest to the position indicator happens to be selected during the period of time when the transmission from the position indicator is stopped (the period of time for the command reception). However, by repeating the selection of all of the loop coils X1 to X40 continuously one more time, detection of the signal from the position indicator becomes possible. In addition, it is also possible to sufficiently lengthen a period of time during which the first round of the continuous transmission is carried out when the operation of the position indicator proceeds from the pause state to the normal operation state, to thereby allow the tablet side to select all of the loop coils.

In this illustrative embodiment, when a command issued from the tablet is not continuously detected three times during the operations shown in FIGS. 6 to 8, respectively, it is determined that the position indicator has been removed from the surface of the tablet. Then, the control circuit 13 of the position indicator enters the pause state, that is, the operation in which no signal is transmitted while the control circuit 13 sends the control signal Se such that the switch 15 is turned ON to operate the amplifying circuit 14, thereby waiting to detect a signal from the tablet.

[Effects of a First Embodiment]

According to the first embodiment described above, the position indicator enters a state in which a command signal from the tablet can be received after completion of the continuously transmitting operation. The tablet starts to transmit a command to the position indicator after the timing when an end of the continuous transmission from the position indicator is recognized in the form of reduction of the detected output Sr. In other words, the end time of the continuously transmitting operation is shared between the position indicator and the tablet, and the communication of a command is carried out during a short period of time commonly recognized by both.

For this reason, a specific type of information can be selected from multiple types of information within the position indicator and transmitted. Accordingly, a rate of transfer of the information from the position indicator to the tablet need not be reduced. Therefore, the sampling rate during the coordinate detection also need not be reduced.

In addition, in this embodiment, since the signal from the tablet can be amplified in the position indicator, even when the signal from the tablet is weak, the weak signal can be precisely extracted in the form of a command. Therefore, each of the loop coils of the tablet can be made from the ITO film or the like having a high resistance value, and the sensor glass 206 having the transparent loop coils can be disposed on the front surface of the display portion 2b.

As a result, a command can be transmitted from a position on the sensor glass 206 to the position indicator. Thus, even when the display portion 2b becomes larger, these multiple types of information in the position indicator, such as the specific ID information and the pen pressure information, can be detected by the tablet at a high speed.

In addition, according to this embodiment, the information, such as the pen pressure information and the slider information, which is transmitted from the position indicator to the tablet, is structured in the form of digital data composed of a plurality of bits. Also, the oscillation circuit 11 is controlled in accordance with a value of the digital data, whereby the information is transmitted in the form of output/non-output of the coil signal Sd in a time-sequential manner. For this reason, the tablet can precisely extract the information sent thereto from the position indicator without being influenced by the noise or the like.

In addition, according to this embodiment, before the information is transmitted from the position indicator to the tablet, the coil signal Sd is transmitted twice at the timing that is synchronous with the clock signal Sa supplied from the clock generating circuit 25. Also, after the two signal transmissions have been completed, the information is transmitted to the tablet 2 synchronously with the clock signal Sa. At the same time, in the tablet, the interval between the two transmissions of the coil signal Sd is measured, and the digital data which is subsequently sent is detected based on the transmission interval thus measured. As a result, it is possible to shorten the time for the communication from the position indicator to the tablet, per 1 bit, and thus it is possible to realize the position detector having a high sampling rate.

In addition, according to the second example of this embodiment, since no signal is transmitted from the position indicator when no position indicator is located on the tablet, it is possible to save power consumption in the position indicator. That is to say, the battery of the position indicator needs not be frequently exchanged or charged.

It is noted that although in the illustrative embodiment described above, an example is given in which the timing extraction period is provided after completion of the continuously transmitting operation from the position indicator 1, the present invention is by no means limited thereto. For example, the timing extraction period may also be provided after completion of the transmission of the 10-bit data from the position indicator 1 (before start of the continuously transmitting operation from the position indicator 1), or while the data is transmitted from the position indicator 1 to the tablet (for example, at a point of time at which the transmission up to the 5 bit is completed), or during the continuously transmitting operation, or the like.

In addition, although in this embodiment, each of the loop coils in the tablet is made from the ITO film on the sensor glass 206, the present invention is by no means limited thereto. For example, each of the loop coils may also be formed by printing a conductor material such as carbon on a PET film.

Also, although in this embodiment, the tablet and the display device are provided integrally with each other, a construction may also be adopted such that no display device is provided.

<2. Second Embodiment>

Next, a second embodiment of the present invention will be described. The second embodiment shows an example in which a rotational angle of the position indicator can be obtained relative to a rotational axis formed by a direction vertical to the tablet surface. The assignee of the present application has previously disclosed one such position detector in Japanese Patent Laid-Open No. H8-30374 (corresponding to U.S. Pat. No. 5,644,108, which is explicitly incorporated by reference herein). This embodiment shows an example in which the rotational angle of the position indicator can be obtained, even on the tablet surface that includes loop coils each made from an ITO film or the like having a high resistance value. In this embodiment, the tablet has the same construction and configuration as those shown in FIGS. 4 and 5, respectively, and used in the first embodiment.

[Construction of a Position Indicator]

Figure 11:
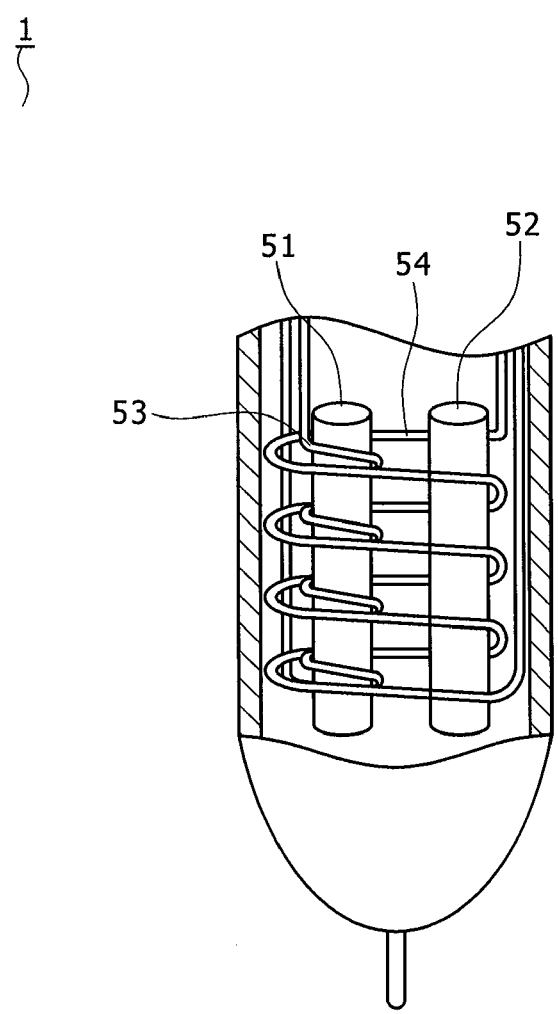
FIG. 11 is a partial cross sectional view showing a construction of a position indicating portion of a position indicator in a second embodiment of the present invention.

FIG. 11 is a partial cross sectional view showing a construction of the position indicating portion of the position indicator in this embodiment. As shown in FIG. 11, two magnetic material cores 51 and 52 are provided in the position indicating portion. Although a ferrite material is desirable as the material used in each of the magnetic material cores 51 and 52, any other suitable material may also be used. In addition, a construction with no core may also be adopted.

A coil 53 (second coil) and a coil 54 (first coil) are wound around the magnetic material core 51. The coil 53 is wound only around the magnetic material core 51, while the coil 54 is wound around the magnetic material core 51 and the magnetic material core 52 so as to bundle the two cores 51 and 52 together. This construction is the same as that disclosed in Japanese Patent Laid-Open No. H8-30374.

[Internal Configuration of a Position Indicator]

Figure 12:
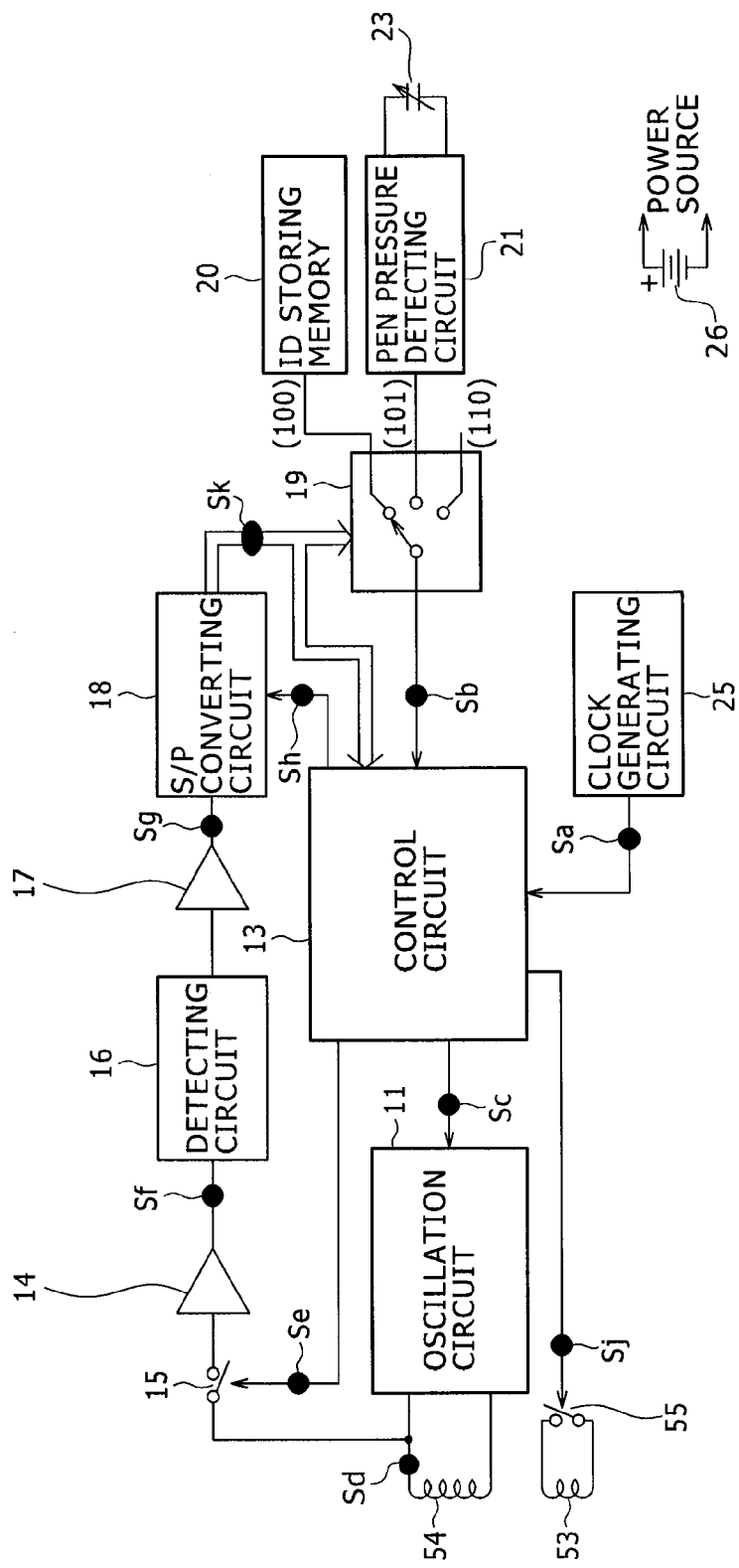
FIG. 12 is a block diagram showing an internal configuration of the position indicator according to the second embodiment of the present invention.

FIG. 12 is a diagram showing an internal configuration of the position indicator according to this embodiment. In FIG. 12, the same constituent portions as those in FIGS. 3 and 11 are designated by the same reference numerals, respectively. The position indicator is provided with the oscillation circuit 11, the coil 53, the coil 54, the control circuit 13, the amplifying circuit 14, the switch 15, the detecting circuit 16, the comparator 17, the S/P converting circuit 18, the switching circuit 19, the ID storing memory 20, the pen pressure detecting circuit 21, the clock generating circuit 25, and the power source 26.

The oscillation circuit 11 is a circuit which is operated together with the coil 54 in accordance with an oscillation control signal Sc supplied thereto from the control circuit 13, thereby generating a coil signal Sd having a predetermined frequency in the coil 54. The coil 54 generates an AC magnetic field in accordance with the coil signal Sd. The tablet detects the AC magnetic field generated from the coil 54 in the position indicator, thereby obtaining the information on the coordinates indicated by the position indicator, the pen pressure, and the like.

Both ends of the coil 53 are connected to opposite terminals of a switch 55, respectively, and the switch 55 is controlled so as to be held either in an ON state or in an OFF state in accordance with a second coil control signal Sj supplied thereto from the control circuit 13.

Since both ends of the coil 53 are opened when the switch 55 is held in the OFF state, the coil 53 exerts no influence on the magnetic field generated from the coil 54. Therefore, the coordinates of a middle position between the magnetic material core 51 and the magnetic material core 52 is detected in the tablet.

Both ends of the coil 53 are short-circuited when the switch 55 is held in the ON state. An electromotive force is generated in the short-circuited coil 53 in such a direction as to cancel a change in magnetic flux passing through the magnetic material core 51. For this reason, less AC magnetic field passes through the magnetic material core 51 and, thus, the magnetic flux passing through the coil 54 is concentrated only on the magnetic material core 52. Therefore, the coordinates corresponding to the magnetic material core 52 are detected in the tablet.

Therefore, the rotational angle of the position indicator, with the direction vertical to the tablet surface as the axis, can be obtained from the coordinate values detected in the tablet when the switch 55 is held in the OFF state, and the coordinate values detected in the tablet when the switch 55 is held in the ON state.

Since other configurations are the same as those in FIG. 3, a description thereof is omitted here.

[Operation of the Embodiment]

Figure 13:
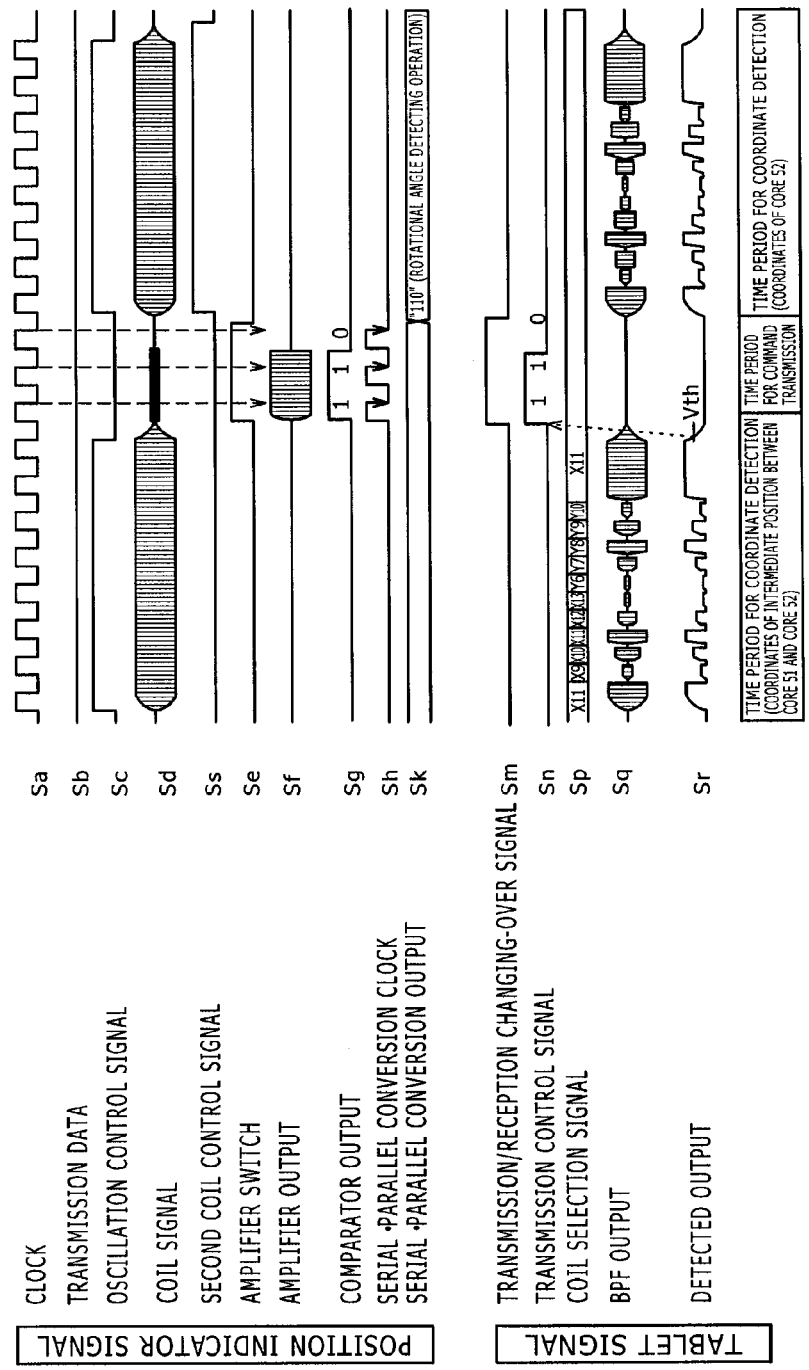
FIG. 13 is a timing chart showing operations of the position indicator and the tablet when the command of "110" is transmitted from the tablet, according to the second embodiment of the present invention.

Next, an operation in this embodiment will be described with reference to FIG. 13. FIG. 13 shows a situation of the operation for transmitting the command of "110" from the tablet 2 to the position indicator, thereby detecting the rotational angle with the direction vertical to the tablet surface of the position indicator as the axis. In FIG. 13, an abscissa axis of each of the clock signals Sa to Sr represents time, and the clock signals Sa to Sr represent the signal waveforms in the portions in FIGS. 5 and 12 designated by the same reference symbols Sa to Sr, respectively.

The CPU 33 of the tablet is assumed to find out in this embodiment as well that the position indicator is placed in the vicinity of the intersection point between the loop coil X11 and the loop coil Y8 by carrying out the initial operation, and thus an operation after that operation will now be described. It is noted that in this embodiment, the commands as the control signals issued from the tablet are expressed in the form of "101" and "100," respectively, and are the same as those in the first embodiment, and thus the same operations as those described with reference to FIGS. 6 and 7, respectively, are carried out. In addition, the initial operations when the position indicator is put on the tablet from the state in which no position indicator exists on the tablet are also the same as those described with reference to FIGS. 9 and 10, respectively.

In FIG. 13, the control circuit 13 of the position indicator supplies the oscillation control signal Sc to the oscillator circuit 11 so that the signal is continuously transmitted from the coil 54 during a time required for the tablet to detect the coordinates, for example, for 1 msec or more. As a result, the position indicator carries out the continuously transmitting operation.

For the purpose of detecting the timing at which the continuously transmitting operation from the position indicator is started, the CPU 33 of the tablet first (previously) sends the coil selection signal Sp used to select the loop coil X11 (or Y8) to the selecting circuit 31. In addition, the CPU 33 sends the transmission/reception switching signal Sm, which causes the switching circuit 34 to connect each of the connection destinations of the line La and the line Lb to the reception side (R).

The CPU 33 checks the output result from the A/D converting circuit 39, and determines that the continuously transmitting operation from the position indicator is started when the voltage is continuously generated in the detected output Sr for the given time, for example, for the period of time of 128 μsec or more. Subsequently, the CPU 33 carries out the same coordinate detecting operations as those in the cases of FIGS. 6 and 7.

In other words, for the purpose of obtaining the signal levels from the five loop coils with the loop coil X11 at the center, the CPU 33 sends the coil selection signal Sp so as to successively select the loop coils X9 to X13. The coil selection signal Sp is sent so as to carry out the successive selection at every period of time of, for example, 64 μsec, for one loop coil. Subsequently, for the purpose of obtaining the signal levels from the five loop coils with the loop coil Y8 at the center, the CPU 33 sends the coil selection signal Sp so as to successively select the loop coils Y6 to Y10.

At this time, the voltage corresponding to the distance between the selected loop coil and the coil 54 of the position indicator appears in the detected output Sr from the detecting circuit 37. In other words, a voltage distribution is obtained such that the highest voltage is obtained when the loop coil X11 and the loop coil Y8 each closest to the position indicator are selected. The X-coordinate value and the Y-coordinate value of the position indicated by the position indicator can be obtained from a peak level and the voltage across the coils adjacent to each other in the voltage distribution. The coordinate values obtained at this time represent an intermediate position between the magnetic material core 51 and the magnetic material core 52. In the following description, these coordinates is referred to as "first coordinates."

Next, for the purpose of waiting for the completion of the continuously transmitting operation from the position indicator, the CPU 33 sends the coil selection signal Sp used to select the loop coil X11 (or Y8) to the selecting circuit 31. At this time, in the coordinate detecting operation described above, if the peak voltage which was generated in the loop coil has been moved to the loop coil adjacent to that loop coil, the position indicated by the position indicator is determined to be moved, and thus the central coil thus updated is selected. Since the voltage of the detected output Sr is gradually reduced when the continuous transmission from the position indicator has been completed, the CPU 33 determines that the continuous transmission has been completed at a point of time when the voltage of the detected output Sr becomes equal to or smaller than the given threshold Vth, and the operation of the CPU 33 proceeds to the command transmitting operation.

The transmission of commands from the tablet to the position indicator are carried out in the same manner as those in the cases of FIGS. 6 and 7, respectively. In other words, when the loop coil (X11 in this case) closest to the position indicator is kept selected, the CPU 33 sends the transmission/reception switching signal Sm, which causes the switching circuit 34 to connect each of the connection destinations of the line La and the Line Lb to the transmission side (T). In addition, the CPU 33 sends the transmission control signal Sn to the switch 40. "1," "1," and "0" are successively outputted as the transmission control signal Sn at, for example, every 128 μsec. For the period of time during which the transmission control signal Sn is held at "1," the AC current is caused to flow through the loop coil selected by the selecting circuit 31.

After completion of the continuously transmitting operation, the control circuit 13 of the position indicator outputs such a control signal Se as to hold the switch 15 in an ON state only for a period of time of three cycles of the clock signal Sa. When the signal is outputted from the loop coil of the tablet during this period of time, an amplifier output Sf appears in the output of the amplifying circuit 14, which causes the output Sg from the comparator 17 to become "1."

At this time, if a period of time (128 μsec in this case) during which the signal of 1 bit is transmitted from the tablet is made to approximately match the period (cycle) of the clock signal Sa in the position indicator, the signal transmitted from the tablet can be extracted synchronously with the clock signal Sa. In other words, if the value of the output Sg from the comparator 17 is read at the falling timing of the clock signal Sa as shown in FIG. 13, the signal transmitted from the tablet can be extracted in the order of "1," "1," and "0." The operations so far are carried out in the same manner as those in the cases of FIGS. 6 and 7, respectively.

When the control circuit 13 of the position indicator has recognized that a command issued from the tablet is "110," which requests the operation for detection of the rotational angle, the control circuit 13 sends such a second coil control signal Sj as to turn ON the switch 55. As a result, the coil 53 is short-circuited.

The control circuit 13 supplies the oscillation control signal Sc to the oscillation circuit 11 in such a way that for the time required for the table to detect the coordinates, for example, 1 msec or more, the signal is continuously transmitted from the coil 54. As a result, the position indicator carries out the continuously transmitting operation. At this time, since the coil 53 is short-circuited by the switch 55, the magnetic field generated due to the AC current caused to flow through the coil 54 hardly passes through the magnetic material core 51, and thus is concentrated on the magnetic material core 52.

On the other hand, in the tablet, similarly to the case of the first coordinate detecting operation described above, the signal levels are successively detected from the five loop coils with the loop coil X11 at the center, and the five loop coils with the loop coil Y8 at the center. As a result, a coordinate position (hereinafter referred to as "second coordinates") corresponding to the magnetic material core 52 is obtained.

The CPU 33 can obtain the rotational angle of the position indicator, with the direction vertical to the tablet surface as the axis, from these two coordinate values (the first coordinates and the second coordinates). In other words, a change in the magnetic flux distribution passing through the coil, caused by the transmission of the control signal to the position indicator, is detected either in the form of a change in signal strength or in the form of a change in coordinate position.

Although in this embodiment, the operation for detection of the rotational angle is carried out when the command issued from the tablet is "110," any other suitable command may also be assigned.

[Effects of a Second Embodiment]

According to this embodiment, in addition to the effects of the first embodiment described above, the following effects are obtained. Since in the second embodiment, the communication of the command from the tablet to the position indicator can be carried out during a short time, it is possible to realize the position detector which can detect the rotational angle of the position indicator at a high sampling rate relative to the direction vertical to the tablet surface as the axis.

In addition, in this embodiment as well, since the signal from the tablet can be amplified in the position indicator, even when the signal from the tablet is weak, the weak signal can be precisely extracted in the form of a command. Therefore, each of the loop coils of the tablet can be made from a ITO film or the like having a high resistance value, and the sensor glass 206 having such transparent loop coils can be disposed on the front surface of the display portion 2b.

<3. Third Embodiment>

Next, a third embodiment of the present invention will be described. This embodiment is such that two position indicating portions (the pen tip side and the eraser side) are provided in the position indicator, and it is possible to detect which side of the position indicator is directed to the tablet surface.

The position indicator of this embodiment does not have multiple types of information, unlike each of the first embodiment and the second embodiment, and has only the pen pressure information either on the pen tip side or on the eraser side.

[Construction of a Position Indicator]

Figure 14:
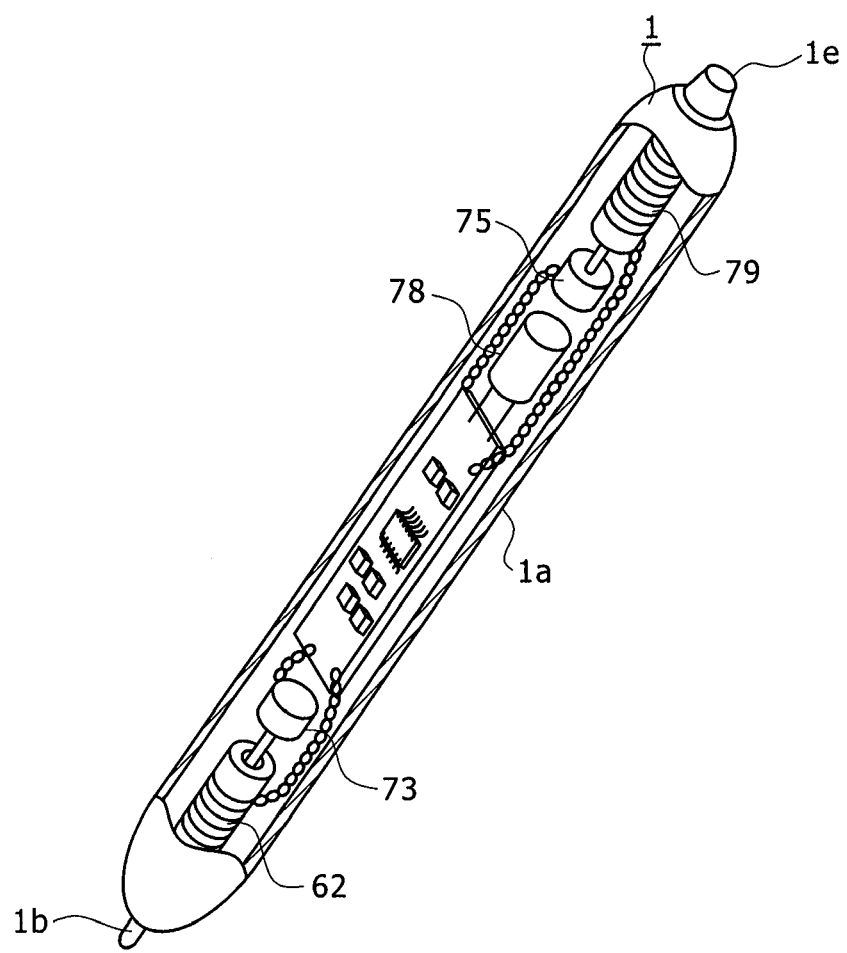
FIG. 14 is a partial cross sectional diagram showing a construction of a position indicator according to a third embodiment of the present invention.

FIG. 14 is a partial cross sectional view showing a construction of the position indicator according to this embodiment. The position indicator of this embodiment also has the pen-like shape, and the tip portion of the rod 1b protrudes from the main body 1a. The position indicator is used in such a way that the tip portion of the rod 1b contacts the tablet surface. Reference numeral 62 designates a hollow-shaped coil. The rod 1b extends completely through the coil 62. In addition, a variable-capacitance capacitor 73 is disposed on a side of the rod 1b opposite to the tip portion of the rod 1b.

The variable-capacitance capacitor 73 changes its capacitance in accordance with a magnitude of the pen pressure applied to the rod 1b. A load applied to the variable-capacitance capacitor 73 is detected in the form of the pen pressure information by a pen pressure detecting circuit 64, which will be described later.

An eraser side is provided in the other end of the position indicator opposite to the pen side. On the eraser side, an eraser rod 1e protrudes from the main body 1a. The position indicator is used in such a way that a tip portion of the eraser rod 1e contacts the tablet surface. Reference numeral 79 designates a hollow-shaped coil and the eraser rod 1e extends completely through the coil 79. In addition, a variable-capacitance capacitor 75 is disposed on the side of the eraser rod 1e opposite to the tip portion of the eraser core 1e. The variable-capacitance capacitor 75 changes its capacitance in accordance with the magnitude of the pen pressure applied to the eraser core 1e. The load applied to the variable-capacitance capacitor 75 is detected in the form of the pen pressure information by a pen pressure detecting circuit 76, which will be described later. In addition, a power source 78 is provided in a central portion of the position indicator.

[Internal Configuration of a Position Indicator]

Figure 15:
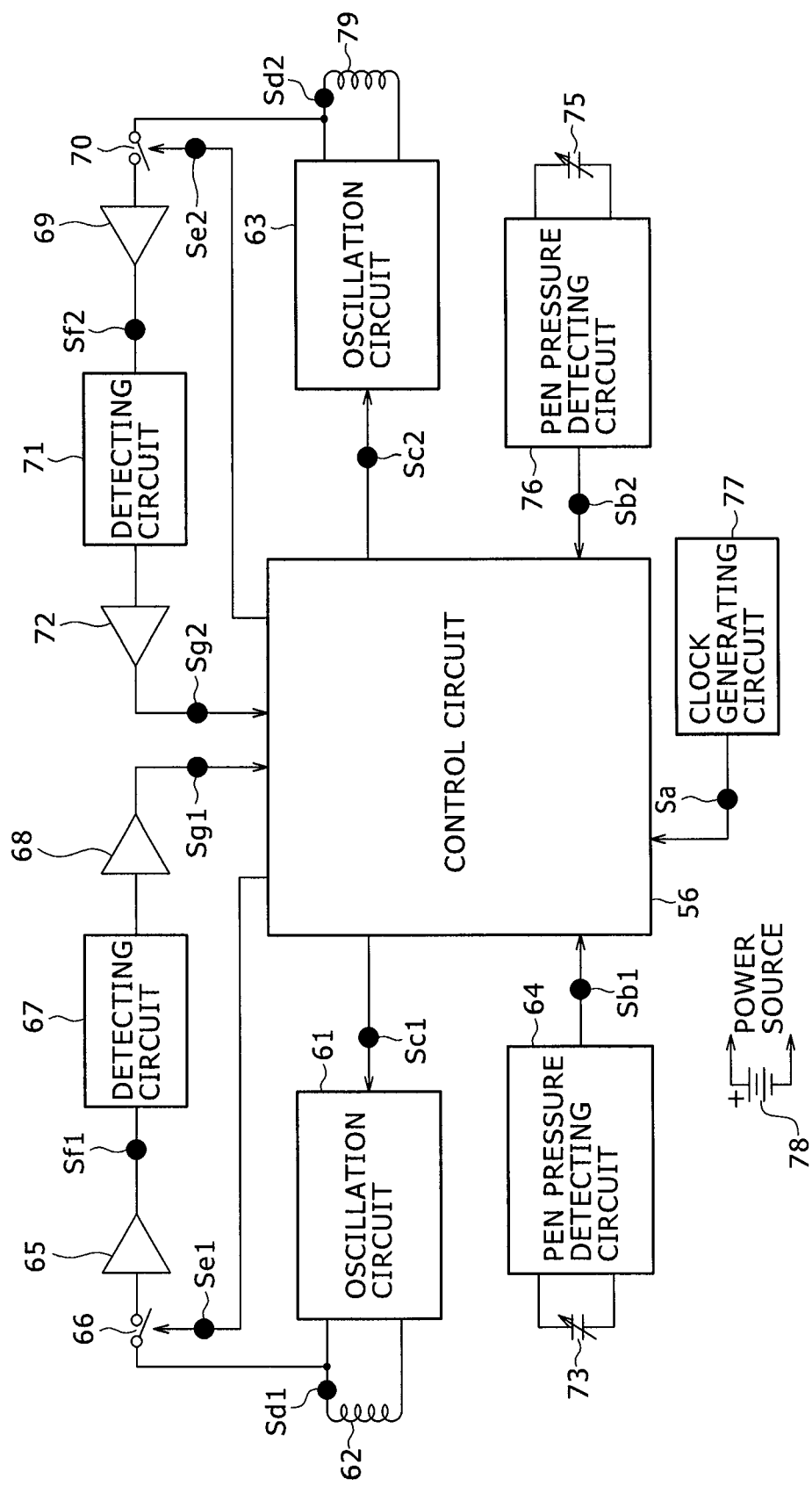
FIG. 15 is a block diagram showing an internal configuration of the position indicator according to the third embodiment of the present invention.

FIG. 15 is a diagram showing an internal configuration of the position indicator according to this embodiment. Portions composing the position indicator include portions relating to an operation of the pen tip side, and portions relating to an operation of the eraser side. Also, these blocks are controlled by a control circuit 56.

The portions relating to the operation of the pen tip side include an oscillation circuit 61, the coil 62, an amplifying circuit 65, a switch 66, a detecting circuit 67, a comparator 68, the variable-capacitance capacitor 73, and the pen pressure detecting circuit 64. The portions relating to the operation of the eraser side include an oscillation circuit 63, the coil 79, an amplifying circuit 69, a switch 70, a detecting circuit 71, a comparator 72, a variable-capacitance capacitor 75, and a pen pressure detecting circuit 76.

The oscillation circuit 61 on the pen tip side is a circuit which is operated together with the coil 62 in accordance with an oscillation control signal Sc1 supplied thereto from the control circuit 56, to thereby generate a coil signal Sd1 having a predetermined frequency in the coil 62. The tablet detects an AC magnetic field generated from the coil 62 of the position indicator, to thereby obtain the information regarding the coordinates indicated by the pen tip side of the position indicator on the tablet, the pen pressure, and the like.

The amplifying circuit 65 is connected to the coil 62 through the switch 66, and amplifies the signal induced in the coil 62 by the tablet. The detecting circuit 67 outputs a voltage corresponding to a level of the output signal from the amplifying circuit 65. The comparator 68 detects whether or not the output voltage from the detecting circuit 67 is equal to or larger than a given voltage, and outputs a detection result as a digital signal. These configurations are adopted for the purpose of detecting whether or not a signal appears in the coil 62 during the pause period of the oscillation circuit 61, to thereby detect whether or not the pen tip side of the position indicator exists on the tablet.

The oscillation circuit 63 on the eraser side is a circuit which is operated together with the coil 79 in accordance with an oscillation control signal Sc2 supplied thereto from the control circuit 56, to thereby generate a coil signal Sd2 having a predetermined frequency in the coil 79. The tablet detects an AC magnetic field generated from the coil 79 of the position indicator, to thereby obtain the information regarding the coordinates indicated by the eraser side of the position indicator, the pen pressure, and the like.

The amplifying circuit 69 on the eraser side is connected to the coil 79 through the switch 70, and amplifies the signal induced in the coil 79 by the tablet. The detecting circuit 71 outputs a voltage corresponding to a level of the output signal from the amplifying circuit 69. The comparator 72 detects whether or not the output voltage from the detecting circuit 71 is equal to or larger than a given voltage, and outputs a detection result as a digital signal. These configurations are adopted for the purpose of detecting whether or not a signal appears in the coil 79 during the pause period of the oscillation circuit 63, to thereby detect whether or not the eraser side of the position indicator exists on the tablet.

The variable-capacitance capacitor 73 on the pen tip side is a capacitor which changes its capacitance in accordance with the pen pressure applied to the pen tip side. The pen pressure detecting circuit 64 converts the capacitance value of the variable-capacitance capacitor 73 into a digital value, and supplies the resulting digital value as the pen pressure information Sb1 on the pen tip side to the control circuit 56. Likewise, the pen pressure detecting circuit 76 converts the capacitance value of the variable-capacitance capacitor 75 into a digital value, and supplies the resulting digital value as the pen pressure information Sb2 on the eraser side to the control circuit 56. Each of the pen pressure detecting circuit 64 and the pen pressure detecting circuit 76 has the same configuration as that of the pen pressure detecting circuit 21 described in the first embodiment.

The clock generating circuit 25 generates a clock signal Sa to supply the clock signal Sa thus generated to the control circuit 56. The control circuit 56 sets (creates) timings for various kinds of operations synchronously with the clock signal Sa. A relatively low frequency, for example, about 8 kHz is adopted for the clock signal Sa. The power source 78 may be a battery for driving the circuits described above.

[Configuration of a Tablet]

Figure 16:
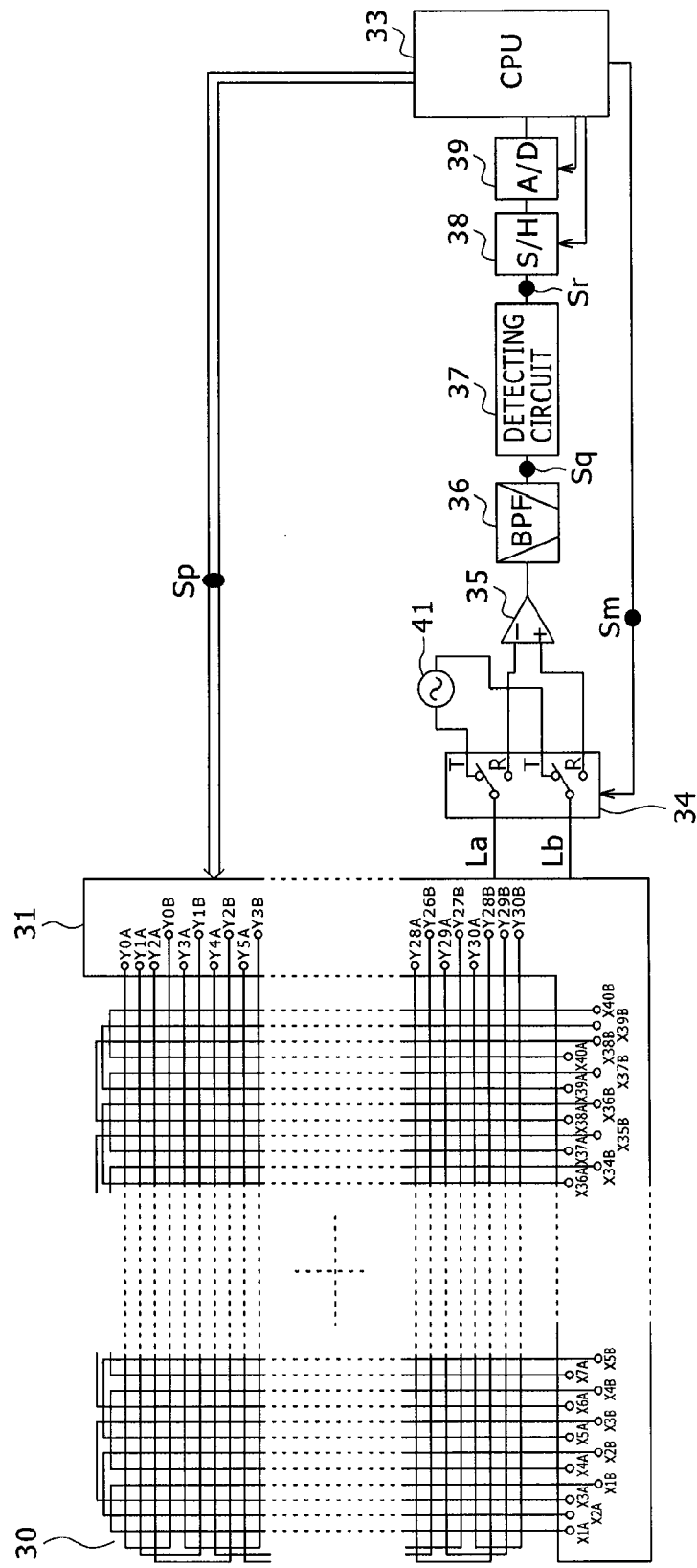
FIG. 16 is a block diagram showing an internal configuration of a tablet according to the third embodiment of the present invention.

FIG. 16 is a diagram showing an example of an internal configuration of the tablet of this embodiment. In FIG. 16, portions having the same configurations as those in the portions in FIG. 5 are designated by the same reference numerals, respectively, and thus a detailed description thereof is omitted. The tablet shown in FIG. 16 is also composed of the loop coil group 30, the selecting circuit 31, the CPU 33, the switching circuit 34, the amplifying circuit 35, the BPF 36, the detecting circuit 37, the S/H circuit 38, the A/D converting circuit 39, and the signal generating circuit 41. The switch 40 in the first embodiment is not provided in the tablet in this embodiment. The reason for this is because the information that the position indicator transmits to the tablet is only the pen pressure information either on the pen tip side or on the eraser side, and thus no command needs to be transmitted from the tablet to the position indicator.

[Operation of the Embodiment]

Next, an operation in this embodiment will be described in accordance with the following order.

(1) An initial operation when the pen tip side is placed on the tablet.
(2) An operation for detecting the coordinates and the pen pressure when the pen tip side is placed on the tablet.
(3) An initial operation when the eraser side is placed on the tablet.
(4) An operation for detecting the coordinates and the pen pressure when the eraser side is placed on the tablet.

(1) An initial operation when the pen tip side is placed on the tablet.

In this embodiment, when the position indicator does not exist on the tablet (initial state), the position indicator transmits the signal from neither of the coil 62 and the coil 79. At this time, by turning ON both the switch 66 and the switch 70, the control circuit 56 of the position indicator can receive a signal from the tablet on either of the pen tip side and the eraser side.

Figure 17:
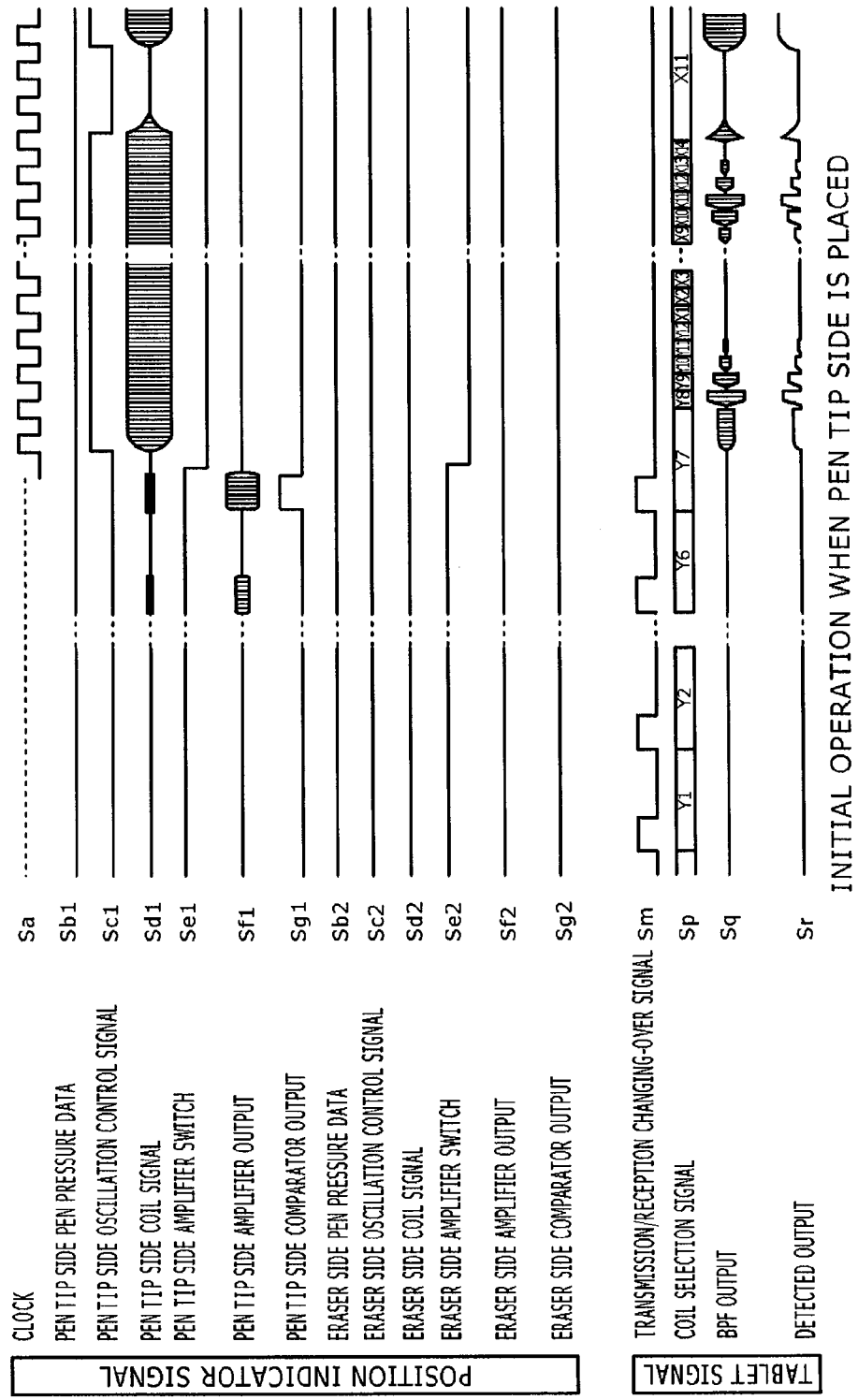
FIG. 17 is a timing chart showing an initial operation of the third embodiment of the present invention when a pen tip side of the position indicator is placed on the tablet.

FIG. 17 is a timing chart showing the initial operation when the pen tip side of the position indicator is put on the tablet. In FIG. 17, an abscissa axis of each of the clock signals Sa to Sr represents time, and the clock signals Sa to Sr represent the signal waveforms in the portions in FIGS. 15 and 16 designated by the same reference symbols Sa to Sr, respectively.

The CPU 33 of the tablet outputs a coil selection signal Sp such that the loop coils Y1 to Y30 are successively selected to the selecting circuit 31. At this time, a time during which one loop coil is selected is set as being sufficiently longer than the cycle of the clock signal Sa of the position indicator.

The CPU 33 changes the transmission/reception switching signal Sm from the transmission side (T) to the reception side (R) during the period of time when one loop coil is selected. As a result, when one loop coil is selected, the receiving operation is carried out following the transmitting operation.

When the pen tip side of the position indicator is placed on the tablet (on the loop coil Y8 in this case), the coil signal Sd1 appears in the coil 62 of the pen tip side of the position indicator when the loop coil near the loop coil Y8 is selected. The coil signal Sd1 at this time is much weaker than the signal when the oscillation circuit 61 is operated. However, when the coil signal Sd1 is inputted to the amplifying circuit 65 through the switch 66, the amplifier output Sf1 and the comparator output Sg1 appear from the amplifying circuit 65 and the comparator 68, respectively, as shown in FIG. 17. In this case, the comparator output Sg1 rises when the loop coil Y7 is selected.

The control circuit 56 of the position indicator sends the control signal Se1 such that the switch 66 is turned OFF as soon as the comparator output Sg1 is detected, to thereby stop the operation of the amplifying circuit 65. Concurrently with this operation, the control circuit 56 sends such a control signal Se2 as to turn OFF the switch 70, to thereby stop the operation of the amplifying circuit 69. Subsequently, the control circuit 56 outputs an oscillation control signal Sc1 to the oscillation circuit 61, to thereby start the continuously transmitting operation from the pen tip side. This operation is one of the features of the present invention.

Since the continuously transmitting operation carried out by the position indicator is started during a period of time when the tablet side selects the loop coil Y7, the detected output Sr from the tablet appears during this period of time as shown in FIG. 17. The CPU 33 recognizes that the position indicator has been placed on the tablet by detecting the detected output Sr.

In addition, for the purpose of checking the loop coil closest to the position indicator 1, the CPU 33 subsequently switches the selection of the loop coil one after another in the order of the loop coil Y8 and the loop coil Y9. In this case, since the signal transmission from the position indicator is already started, transmission need not be carried out and only reception has to be carried out.

In FIG. 17, the highest voltage is detected when the loop coil Y8 is selected. However, as the CPU 33 switches the loop coil one after another in the order of the loop coil Y9, the loop coil Y10, the loop coil Y11, and the loop coil 12, the voltage of the detected output Sr becomes gradually lower. Therefore, the CPU 33 can recognize that the position indicator exists on the loop coil Y8.

When the selection up to the loop coil Y12 has been completed, for the purpose of determining of which of the loop coils in the X-axis the position indicator is put in the vicinity, the CPU 33 successively selects the loop coils X1 to X40, to thereby carry out the receiving operation. In other words, the CPU 33 detects the highest detected output Sr when the loop coil X11 is selected, and as the CPU 33 switches the loop coil one after another in the order of the loop coil X12, the loop coil X13, and the loop coil X14, the voltage of the detected output Sr becomes gradually lower. Therefore, the CPU 33 can recognize that the position indicator exists on the loop coil X11. Therefore, the CPU 33 completes the selection of the loop coils at the loop coil X14, and selects the loop coil X11 (or Y8) in which the strongest signal is detected. The CPU 33 selects the loop coil X11 (or Y8), whereby the detected output Sr is generated again. The CPU 33 waits for the temporary completion of the continuous transmission from the position indicator while looking at the voltage of the detected output Sr, and thereafter detects the timing at which the continuous transmission is started again. In such a manner, the operation of the CPU 33 proceeds to the operation for detecting the coordinates and the pen pressure, which will be described later.

(2) An operation for detecting the coordinates and the pen pressure when the pen tip side is placed on the tablet.

Figure 18:
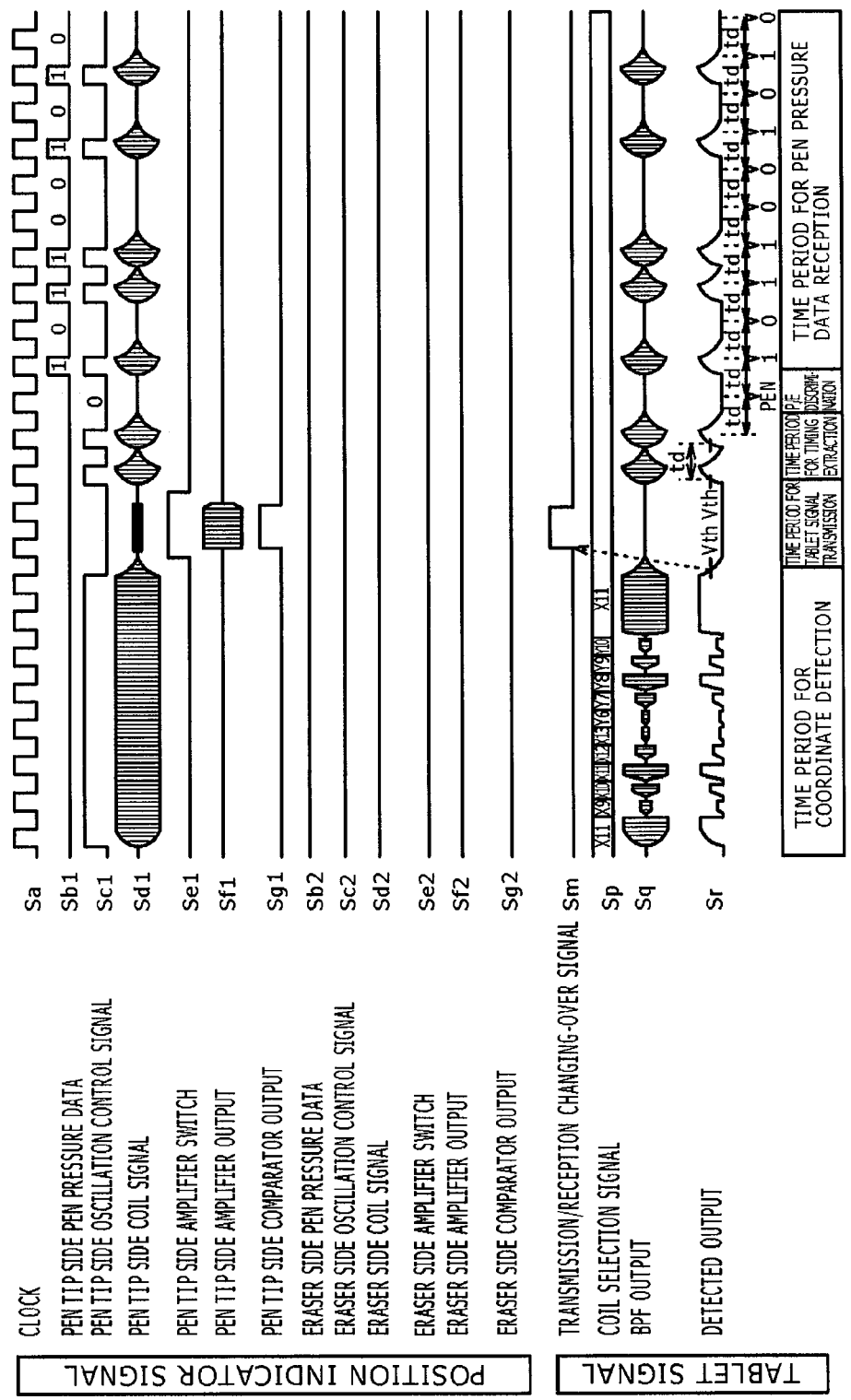
FIG. 18 is a timing chart showing a pen coordinate (pen position)/pen pressure detecting operation of the third embodiment of the present invention when the pen tip side of the position indicator is placed on the tablet.

FIG. 18 shows that an operation for detecting the coordinates and the pen pressure is repetitively carried out after it has been determined that the position indicator exists in the vicinity of an intersection point between the loop coil X11 and the loop coil Y8 through the initial operation described above.

For the purpose of detecting a timing at which the continuously transmitting operation from the position indicator is started, the CPU 33 of the tablet sends a coil selection signal Sp used to select the loop coil X11 (or Y8) to the selecting circuit 31. In addition, the CPU 33 sends the transmission/reception switching signal Sm, which causes the switching circuit 34 to connect each of the connection destinations of the line La and the line Lb to the reception side (R).

The CPU 33 checks the output result from the A/D converting circuit 39, and determines that the continuously transmitting operation from the position indicator is started when the voltage is continuously generated in the detected output Sr for a given time, for example, for a period of time of 128 μsec or more. This operation is carried out to distinguish a continuous signal from a signal which is intermittently transmitted from the position indicator, similarly to the case of the first embodiment. The CPU 33 subsequently carries out the coordinate detecting operation.

The coordinate detecting operation is carried out in the same manner as that described with reference to FIGS. 6 to 8 in the first embodiment, and thus the X-coordinate and the Y-coordinate of the position indicator are obtained.

Next, for the purpose of waiting for completion of the continuously transmitting operation from the position indicator, the CPU 33 sends the coil selection signal Sp used to select the loop coil X11 (or Y8) to the selecting circuit 31. At this time, in the coordinate detecting operation described above, if the peak voltage which was generated in the loop coil has been moved to the loop coil adjacent to that loop coil, the position indicated by the position indicator is determined to be moved, and thus the central coil thus updated is selected. Since the voltage of the detected output Sr is gradually reduced when the continuous transmission from the position indicator has been completed, the CPU 33 determines that the continuous transmission has been completed at a point of time when the voltage of the detected output Sr becomes equal to or smaller than the given threshold Vth, and the operation of the CPU 33 proceeds to a tablet signal transmission operation for a period of time, which will be next described.

Note that, while the coordinate detecting operation in the tablet is carried out, that is, while the continuous transmission from the position indicator is carried out, the pen pressure detecting operation is carried out by the pen pressure detecting circuit 64 within the position indicator similarly to the case of the first embodiment. By carrying out the initial operation described above, the control circuit 56 of the position indicator has recognized that the pen tip side was placed on the tablet. Therefore, the control circuit 56 carries out a control in such a way that the pen pressure detecting circuit 64 is operated through the path (not shown), while the pen pressure detecting circuit 76 (on the eraser side) is not operated.

When the voltage of the detected output Sr has become equal to or smaller than the given threshold Vth, to indicate the completion of the continuous transmission, the operation of the CPU 33 of the tablet proceeds to a tablet signal transmission operation for a period of time. The selecting circuit 31 sends the transmission/reception switching signal Sm, which causes the switching circuit 34 to connect each of the connection destinations of the line La and the line Lb to the transmission side (T), for example, for a period of time of 128 μsec, while the loop coil closest to the position indicator is kept selected. As a result, the loop coil thus selected is connected to the signal generating circuit 41, so that an AC current is caused to flow through that loop coil. The current caused to flow is not much because the loop coil is made from an ITO film and the like, and thus the resistance value thereof is as large as several kilo-ohms to several tens of kilo-ohms. However, a signal having, for example, about several milli-volts is generated in the coil 62 of the pen tip side of the position indicator.

After completion of the continuously transmitting operation, for the purpose of receiving the signal from the tablet, the control circuit 56 of the position indicator outputs such a control signal Se1 as to hold the switch 66 in an ON state only for a period of time of two cycles of the clock signal Sa. When the signal is outputted from the loop coil of the tablet during this period of time, an amplifier output Sf1 appears in the output of the amplifying circuit 65, which causes an output Sg1 from the comparator 68 to become "1." As a result, the control circuit 56 recognizes that the position indicator is continuously placed on the tablet.

Having detected the output Sg1 from the comparator 68 during the tablet signal transmission period described above, the control circuit 56 of the position indicator proceeds to carry out the same operation for timing extraction as that in the first embodiment. In other words, the control circuit 56 of the position indicator transmits the signal twice from the coil 62 of the pen tip side synchronously with the clock signal Sa.

Note that, when no output Sg1 from the comparator 68 is detected during the tablet signal transmission period described above, the control circuit 56 of the position indicator determines that the position indicator has been removed from a position on the tablet, and controls the signals so as to obtain the initial operation state described above.

When the transmission of the signal from the loop coil has been completed, the operation on the tablet side proceeds to the timing extraction period. The CPU 33 measures twice a time at which the result from the A/D converting circuit 39 exceeds the given threshold Vth, similarly to the case of the first embodiment. Thus, an interval between the times of the two measurements is obtained in the form of "td." The time td should approximately match the cycle of the clock signal Sa of the position indicator. After that, the CPU 33 can precisely extract the data transmitted thereto from the position indicator by detecting the signal at every time period of td.

When the two transmissions described above have been completed in the position indicator, the control circuit 56 successively sends data of 11 bits, which will be described later, as an oscillation control signal Sc1 to the oscillation circuit 61 on the pen tip side. The data of 11 bits is outputted synchronously with the rising of the clock signal Sa. Thus, the oscillation control signal Sc1 is outputted as "1" when the data is "1," and the oscillation control signal Sc1 is outputted as "0" when the data is "0." The first bit of the data of 11 bits represents the direction of the position indicator oriented (pointed) to the tablet surface, and is "0" representing the pen tip side in the example of FIG. 18. In addition, in this embodiment, there is shown a case where the pen pressure information on the pen pressure side is "1011001010."

While the signal from the loop coil X11 (or Y8) is continuously detected in the tablet, a voltage equal to or larger than the given threshold Vth is generated in the detected output Sr when the transmitted data from the position indicator is "1." On the other hand, no voltage is generated in the detected output Sr when the transmitted data from the position indicator is "0."

The CPU 33 sets a point of time slightly later than the time, at which the detected output Sr exceeds the given threshold Vth for the second time during the period of time for the timing extraction described above, as a basing point, and checks the output result from the A/D converting circuit 39 at every integer multiple of the time td. Then, "1" is stored when the output from the A/D converting circuit 39 exceeds the above given threshold Vth, and "0" is stored when the output from the A/D converting circuit 39 is smaller than the above given threshold Vth. By repetitively carrying out this operation 11 times, the CPU 33 completes the reception of the pen pressure information of 11 bits transmitted thereto from the position indicator. In FIG. 18, since the first data sent from the position indicator is "0," the CPU 33 can recognize that the pen tip side is oriented (pointed) to the tablet. This operation is one of the features of the present invention.

After completion of the transmission of the pen pressure information, the control circuit 56 of the position indicator starts to carry out the continuously transmitting operation described above again in order to continuously carry out the coordinate detection in the tablet.

(3) An initial operation when the eraser side is placed on the tablet.

Figure 19:
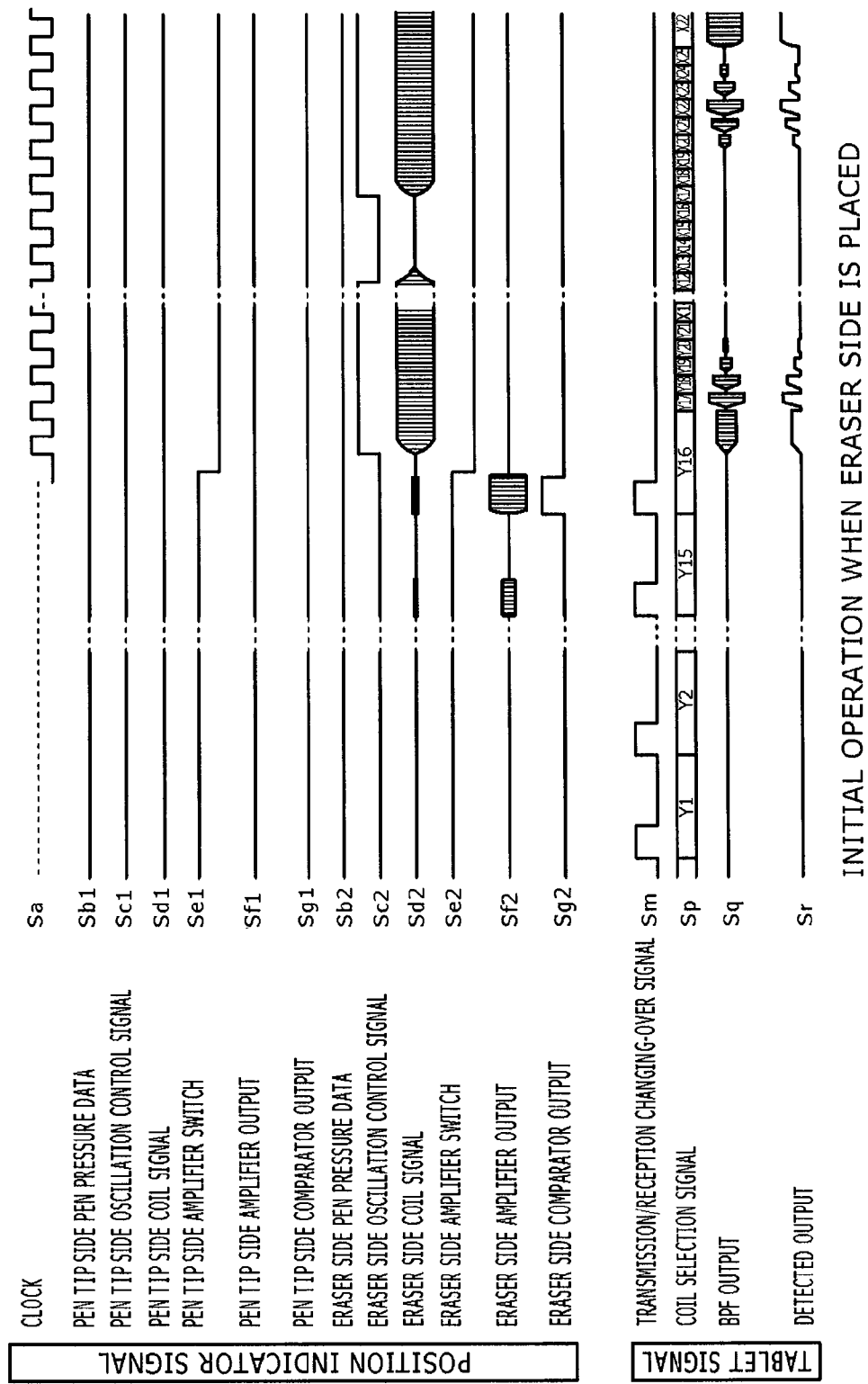
FIG. 19 is a timing chart showing an initial operation of the third embodiment of the present invention when an eraser side of the position indicator is placed on the tablet.

FIG. 19 is a timing chart showing an initial operation when the eraser side of the position indicator is placed on the tablet. In FIG. 19, an abscissa axis of each of the clock signals Sa to Sr represents time, and the clock signals Sa to Sr represent the signal waveforms in the portions in FIGS. 15 and 16 designated by the same reference symbols Sa to Sr, respectively. The initial operation when the eraser side is placed on the tablet is carried out completely in the same manner as that in the case of the pen tip side.

The CPU 33 of the tablet successively selects the loop coils Y1 to Y30 for the selecting circuit 31 through switching, and continuously carries out the transmission and the reception while one loop coil is selected.

When the eraser side of the position indicator is placed on the tablet (on the loop coil Y17 in this case), the coil signal Sd2 appears in the coil 79 of the eraser side of the position indicator when the loop coil near the loop coil Y17 is selected. The coil signal Sd2 at this time is much weaker than the signal when the oscillation circuit 63 is operated. However, when the coil signal Sd2 is inputted to the amplifying circuit 69 through the switch 70, the amplifier output Sf2 and the comparator output Sg2 appear from the amplifying circuit 69 and the comparator 72, respectively, as shown in FIG. 19. In this case, the comparator output Sg2 rises when the loop coil Y16 is selected.

The control circuit 56 of the position indicator sends the control signal Se2 such that the switch 70 is turned OFF as soon as the comparator output Sg2 is detected, to thereby stop the operation of the amplifying circuit 69. Concurrently with this operation, the control circuit 56 sends such a control signal Se1 as to turn OFF the switch 66, to thereby stop the operation of the amplifying circuit 65. Subsequently, the control circuit 56 outputs an oscillation control signal Sc2 to the oscillation circuit 63, to thereby start the operation for the continuous transmission from the eraser side.

Since the continuously transmitting operation carried out by the position indicator is started during a period of time when the tablet side selects the loop coil Y16, the detected output Sr from the tablet appears during this period of time as shown in FIG. 19. The CPU 33 recognizes that the position indicator has been placed on the tablet by detecting the detected output Sr. After that, the CPU 33 of the tablet obtains an approximate position on the tablet on which the position indicator is placed, similarly to the case described with reference to FIG. 17. The case where the eraser side of the position indicator is placed in the vicinity of the intersection point between the loop coil X22 and the loop coil Y17 is shown in this embodiment.

Subsequently, the CPU 33 selects the loop coil X22 (or Y17) in which the strongest signal is detected. When the CPU 33 selects the loop coil X22 (or Y17), the detected output Sr is generated again. The CPU 33 waits for the temporary completion of the continuous transmission from the position indicator while looking at the voltage of the detected output Sr, and thereafter detects the timing at which the continuous transmission is started again. In such a manner, the operation of the CPU 33 proceeds to the operation for detecting the coordinates and the pen pressure, which will be described later.

(4) An operation for detecting the coordinates and the pen pressure when the eraser side is placed on the tablet.

Figure 20:
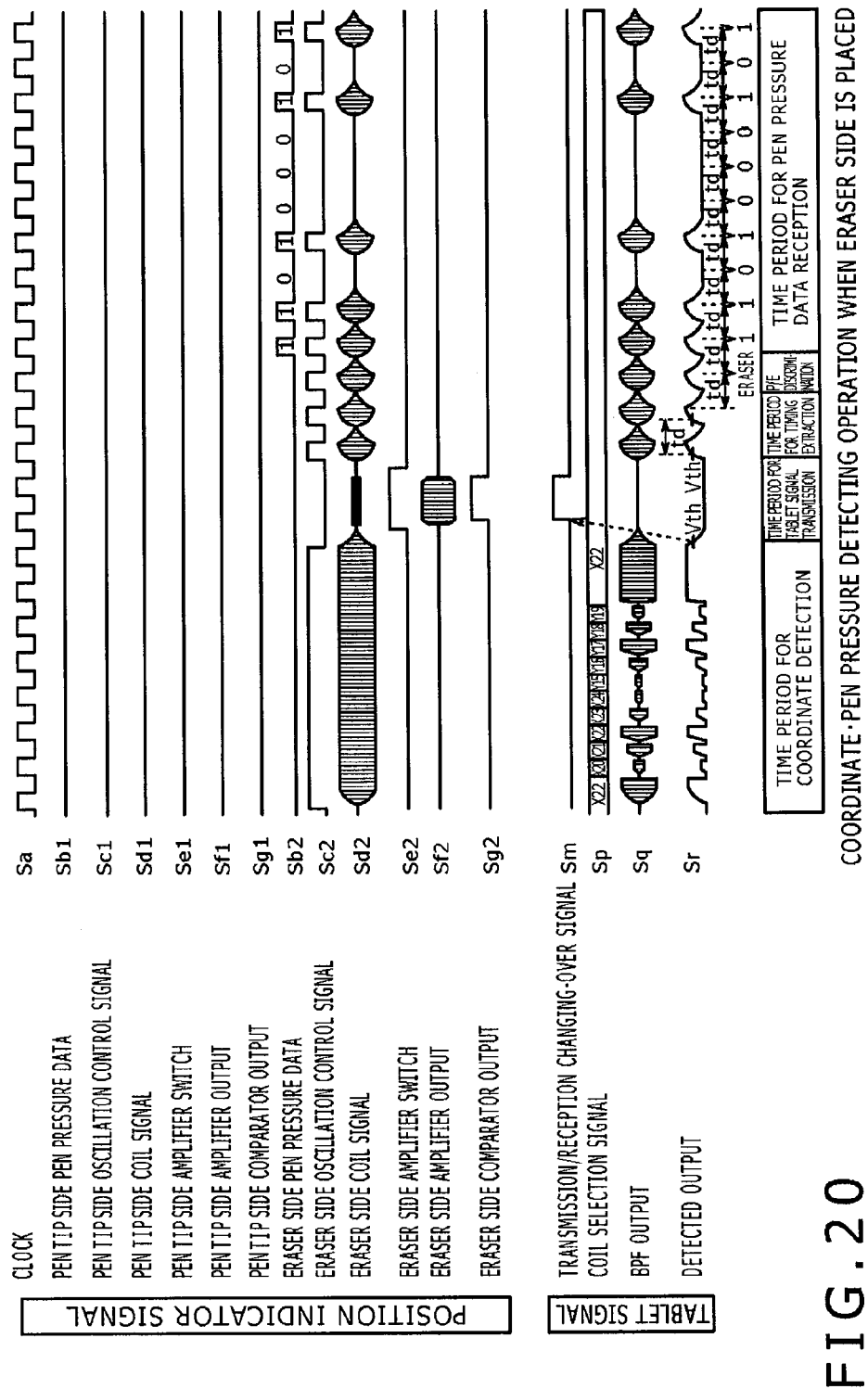
FIG. 20 is a timing chart showing a pen coordinate/pen pressure detecting operation of the third embodiment of the present invention when the eraser side of the position indicator is placed on the tablet.

FIG. 20 shows that an operation for detecting the coordinates and the pen pressure is repetitively carried out after it has been determined that the position indicator exists in the vicinity of the intersection point between the loop coil X22 and the loop coil Y17 through the initial operation described above. This operation is carried out completely in the same manner as that in the pen tip side operation described with reference to FIG. 18.

FIG. 20 is different from FIG. 18 only in the content of the data of 11 bits transmitted from the position indicator. In FIG. 20, since the first data of the data of 11 bits detected on the tablet side is "1," the CPU 33 can recognize that the eraser side is oriented to the tablet. FIG. 20 shows a case where the pen pressure information on the eraser side is "1101000101."

[Effects of a Third Embodiment]

According to this embodiment, since no signal is transmitted from the position indicator when no position indicator exists on the tablet, it is possible to save the power consumption in the position indicator. In other words, the battery of the position indicator needs not to be exchanged or charged frequently.

In addition, according to this embodiment, the direction of the position indicator oriented to the tablet is determined based on the direction (or the side) through which the signal from the tablet is inputted, and the position indication signal is transmitted only from the side oriented to the tablet. Therefore, even when a plurality of position indicating portions are provided in the position indicator, the power consumption of the position indicator does not substantially increase. Thus, the battery of the position indicator needs not to be exchanged or charged frequently.

In addition, in this embodiment as well, since the signal from the tablet is amplified in the position indicator, the signal can be transmitted to the position indicator by the sensor glass disposed on the front surface of the display device. Therefore, with the large-scaled display device, it is possible to detect the orienting direction indicated by the position indicator, which is provided with a plurality of position indicating portions (e.g., the pen tip side and the eraser side).

In this embodiment, the amplifying circuit, the detecting circuit, and the comparator are provided in each of the pen tip side and the eraser side. However, the amplifying circuit, the detecting circuit, and the comparator may also be provided in one of the pen tip side and the eraser side. In this case, the pen tip side and the eraser side may be switched between each other, and thus the respective pieces of pen pressure information may be detected in a time division manner.

Although in this embodiment, the data representing the direction oriented to the tablet is transmitted earlier than the pen pressure data, the transmission order may be reversed.

The various embodiments described above can be combined to provide further embodiments. All of the U.S. patents, foreign patents, and foreign patent publications referred to in this specification and/or listed in the Application Data Sheet are incorporated herein by reference, in their entirety. Aspects of the embodiments can be modified, if necessary to employ concepts of the various patents and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of establishing bi-directional communication between a position indicator and a position detecting sensor, comprising:
transmitting a first signal from a tip transmitter/receiver provided at a tip end of an elongate body of the position indicator, wherein the first signal is indicative of a position of the tip end;
transmitting a second signal from a proximal transmitter/receiver provided at a proximal end of the elongate body of the position indicator, wherein the second signal is indicative of a position of the proximal end;
receiving, by at least one of the tip receiver and the proximal receiver of the position indicator, a sensor signal outputted from the position detecting sensor during a time period in which neither the first signal nor the second signal is transmitted; and
selecting between the transmitting of the first signal and the transmitting of the second signal based on reception of the sensor signal.

2. The method of claim 1, wherein the selecting is based on which of the tip transmitter/receiver and the proximal transmitter/receiver receives the sensor signal.

3. The method of claim 2, wherein the selecting selects the transmitting of the first signal when the tip transmitter/receiver receives the sensor signal, and selects the transmitting of the second signal when the proximal transmitter/receiver receives the sensor signal.

4. The method of claim 2, further comprising:
receiving the sensor signal time-divisionally at the tip transmitter/receiver and the proximal transmitter/receiver.

5. The method of claim 1, further comprising:
ceasing transmission of the first signal and the second signal when not detecting the sensor signal at the position indicator for a defined period of time.

6. The method of claim 1, wherein the first signal and the second signal are distinguishable from each other.

7. The method of claim 6, wherein the first signal is a bit sequence starting with "0" and the second signal is a bit sequence starting with "1".

8. The method of claim 1, wherein the first signal indicates at least one of the position of the tip end and a pressure applied to the tip end, and the second signal indicates at least one of the position of the proximal end and a pressure applied to the proximal end, and the method further comprises:
alternatively transmitting, from the tip transmitter/receiver, the first signal indicative of the position of the tip end and the first signal indicative of the pressure applied to the tip end, and
alternately transmitting, from the proximal transmitter/receiver, the second signal indicative of the position of the proximal end and the second signal indicative of the pressure applied to the proximal end.

9. The method of claim 8, further comprising:
detecting the pressure applied to the tip end based on a variable-capacitance capacitor provided at the tip end; and
detecting the pressure applied to the proximal end based on a variable-capacitance capacitor provided at the proximal end.

10. The method of claim 1, wherein the second signal outputted from the proximal transmitter/receiver is indicative of an eraser function of the position indicator.

11. A pen-shaped position indicator, comprising:
an elongate body having a tip end and a proximal end;
a tip transmitter/receiver provided at the tip end;
a proximal transmitter/receiver provided at the proximal end;
a control circuit configured to selectively transmit a first signal from the tip transmitter/receiver and a second signal from the proximal transmitter/receiver, respectively, wherein the first signal is indicative of a position of the tip end and the second signal is indicative of a position of the proximal end; and
a power source;
wherein the control circuit receives, via at least one of the tip receiver and the proximal receiver, a sensor signal outputted from a position detecting sensor during a time period in which neither the first signal nor the second signal is transmitted; and
wherein the control circuit selects between the transmission of the first signal and the transmission of the second signal based on reception of the sensor signal.

12. The position indicator of claim 11, wherein the control circuit selects between the transmission of the first signal and the second signal base on which of the tip transmitter/receiver and the proximal transmitter/receiver receives the sensor signal.

13. The position indicator of claim 12, wherein the control circuit selects the transmission of the first signal when the tip transmitter/receiver receives the sensor signal, and selects the transmission of the second signal when the proximal transmitter/receiver receives the sensor signal.

14. The position indicator of claim 12, wherein the tip transmitter/receiver and the proximal transmitter/receiver are configured to time-divisionally receive the sensor signal.

15. The position indicator of claim 11, wherein the control circuit, when not detecting the sensor signal for a defined period of time, ceases transmission of the first signal and the second signal.

16. The position indicator of claim 11, wherein the first signal and the second signal are distinguishable from each other.

17. The position indicator of claim 16, wherein the first signal is a bit sequence starting with "0" and the second signal is a bit sequence starting with "1".

18. The position indicator of claim 11, further comprising:
a tip pressure sensor configured to detect a pressure applied to the tip end of the position indicator;
a proximal pressure sensor configured to detect a pressure applied to the proximal end of the position indicator;
wherein the first signal indicates at least one of the position of the tip end and the pressure detected by the tip pressure sensor, and the second signal indicates at least one of the position of the proximal end and the pressure detected by the proximal pressure sensor.

19. The position indicator of claim 18, wherein the tip transmitter/receiver alternately transmits the first signal indicative of the position of the tip end and the first signal indicative of the pressure detected by the tip pressure sensor, and the proximal transmitter/receiver alternately transmits the second signal indicative of the position of the proximal end and the second signal indicative of the pressure detected by the proximal pressure sensor.

20. The position indicator of claim 18, wherein the tip pressure sensor and the proximal pressure sensor each comprises a variable-capacitance capacitor.

21. The position indicator of claim 11, wherein the proximal end is an eraser end.

* * * * *